United States Patent
Moriya

(10) Patent No.: US 11,726,367 B2
(45) Date of Patent: Aug. 15, 2023

(54) PHASE DIFFERENCE FILM, METHOD FOR MANUFACTURING PHASE DIFFERENCE FILM, POLARIZING PLATE, AND LIQUID CRYSTAL DISPLAY DEVICE

(71) Applicant: FUJIFILM Corporation, Tokyo (JP)

(72) Inventor: Chie Moriya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 113 days.

(21) Appl. No.: 17/177,541

(22) Filed: Feb. 17, 2021

(65) Prior Publication Data

US 2021/0278728 A1 Sep. 9, 2021

Related U.S. Application Data

(63) Continuation of application No. PCT/JP2019/032811, filed on Aug. 22, 2019.

(30) Foreign Application Priority Data

Aug. 30, 2018 (JP) ................. 2018-161442

(51) Int. Cl.
*G02F 1/1337* (2006.01)
*G02F 1/1335* (2006.01)
*C09K 19/40* (2006.01)
*G02F 1/137* (2006.01)
*C09K 19/04* (2006.01)

(52) U.S. Cl.
CPC ...... *G02F 1/133742* (2021.01); *C09K 19/404* (2013.01); *G02F 1/13731* (2013.01); *G02F 1/133531* (2021.01); *G02F 1/133711* (2013.01); *C09K 2019/0448* (2013.01)

(58) Field of Classification Search
None
See application file for complete search history.

(56) References Cited

U.S. PATENT DOCUMENTS

2013/0286329 A1* 10/2013 Goto ................. G02B 5/3016
                                                        349/194
2019/0170922 A1   6/2019 Katoh et al.

FOREIGN PATENT DOCUMENTS

| JP | 2006-297831 A | 11/2006 |
| JP | 2007-003917 A | 1/2007 |
| JP | 2014-164142 A | 9/2014 |
| JP | 2016-139566 A | 8/2016 |
| JP | 2016-206236 A | 12/2016 |
| WO | 2018/030449 A1 | 2/2018 |

OTHER PUBLICATIONS

Translation of JP2016206236A (Year: 2016).*
International Search Report issued in PCT/JP2019/032811 dated Oct. 1, 2019.
Written Opinion issued in PCT/JP2019/032811 dated Oct. 1, 2019.
International Preliminary Report on Patentability completed by WIPO dated Mar. 2, 2021 in connection with International Patent Application No. PCT/JP2019/032811.
Office Action, issued by the Japanese Patent Office dated Mar. 29, 2022, in connection with corresponding Japanese Patent Application No. 2020-539389.
Office Action, issued by the Japanese Patent Office dated Nov. 30, 2021, in connection with corresponding Japanese Patent Application No. 2020-539389.

* cited by examiner

*Primary Examiner* — Phu Vu
(74) *Attorney, Agent, or Firm* — Edwards Neils LLC; Jean C. Edwards, Esq.

(57) ABSTRACT

An object of the present invention is to provide a phase difference film having excellent alignment without the need for alignment treatment on a support, a method for manufacturing a phase difference film, a polarizing plate, and a liquid crystal display device. The phase difference film of the present invention includes a support, and a liquid crystal layer formed of a liquid crystal composition containing a liquid crystalline compound so as to be in contact with the support, in which a surface energy of a surface of the support on which the liquid crystal layer is formed is 45 mN/m or more and a non-polar dispersion force component included in the surface energy is 45 mN/m or more, the liquid crystalline compound is immobilized in an aligned state, and a contrast is more than 10000.

9 Claims, No Drawings

PHASE DIFFERENCE FILM, METHOD FOR MANUFACTURING PHASE DIFFERENCE FILM, POLARIZING PLATE, AND LIQUID CRYSTAL DISPLAY DEVICE

CROSS-REFERENCE TO RELATED APPLICATIONS

This application is a Continuation of PCT International Application No. PCT/JP2019/032811 filed on Aug. 22, 2019, which was published under PCT Article 21(2) in Japanese, and which claims priority under 35 U.S.C. § 119(a) to Japanese Patent Application No. 2018-161442 filed on Aug. 30, 2018. The above applications are hereby expressly incorporated by reference, in their entirety, into the present application.

BACKGROUND OF THE INVENTION

1. Field of the Invention

The present invention relates to a phase difference film, a method for manufacturing a phase difference film, a polarizing plate, and a liquid crystal display device.

2. Description of the Related Art

In the related art, a polarizing plate having a phase difference film and a polarizer has been used for a liquid crystal display device, an organic electroluminescent device, or the like for the purpose of optical compensation, antireflection, or the like.

As a method for manufacturing a phase difference film having such a polarizing plate, JP2014-164142A discloses a method for obtaining a phase difference film in which a liquid crystal layer is formed on a surface of a support by applying a liquid crystal composition including a liquid crystalline compound to a surface of a film (support) formed of an alicyclic olefin-based polymer.

SUMMARY OF THE INVENTION

As disclosed in JP2014-164142A, a method of performing an alignment treatment to the support has been known as a method for improving the alignment of the phase difference film, but there is a problem that the alignment of the phase difference film varies depending on the conditions and the like of the alignment treatment. Therefore, in order to obtain a phase difference film having excellent alignment, the manufacturing procedure may be complicated, for example, strict management of alignment treatment conditions is required.

Therefore, an object of the present invention is to provide a phase difference film having excellent alignment without the need for alignment treatment on a support, a method for manufacturing a phase difference film, a polarizing plate, and a liquid crystal display device.

As a result of intensive studies on the above-described objects, the present inventors have found that, in a phase difference film having a support and a liquid crystal layer formed so as to be in contact with the support, in a case where a support having a predetermined value or more a surface energy and a non-polar dispersion force component included in the surface energy is used and a contrast of the phase difference film exceeds a predetermined value, a phase difference film having excellent alignment can be obtained without using a support subjected to an alignment treatment, and have completed the present invention.

That is, the present inventors have found that the above-described objects can be achieved by the following configurations.

[1] A phase difference film comprising:
a support; and
a liquid crystal layer formed of a liquid crystal composition containing a liquid crystalline compound so as to be in contact with the support,
in which a surface energy of a surface of the support on which the liquid crystal layer is formed is 45 mN/m or more and a non-polar dispersion force component included in the surface energy is 45 mN/m or more,
the liquid crystalline compound is immobilized in an aligned state, and
a contrast is more than 10000.

[2] The phase difference film according to [1],
in which a material constituting the support is polycarbonate.

[3] The phase difference film according to [1] or [2],
in which the liquid crystal layer exhibits smectic properties.

[4] The phase difference film according to any one of [1] to [3],
in which the liquid crystal composition further contains a boronic acid monomer having a polymerizable group and a boronic acid group represented by Formula (B) described later,
in Formula (B) described later, $R^1$ and $R^2$ each independently represent a hydrogen atom, a substituted or unsubstituted aliphatic hydrocarbon group, an aryl group, or a heterocyclic group, $R^1$ and $R^2$ may be linked to each other to form a ring, and * represents a bonding position.

[5] A method for manufacturing the phase difference film according to any one of [1] to [4], the method comprising:
a step of applying a liquid crystal composition including a liquid crystalline compound and a solvent to a surface of a support to form a liquid crystal layer so as to be in contact with the support,
in which the solvent contains a solvent A which does not dissolve the support and a solvent B which has a lower boiling point than the solvent A and dissolves the support, and
both contents of the solvent A and the solvent B are 10% by mass or more with respect to a total mass of the liquid crystal composition.

[6] A polarizing plate comprising:
the phase difference film according to any one of [1] to [4]; and
a polarizer.

[7] The polarizing plate according to [6],
in which the polarizer, the liquid crystal layer included in the phase difference film, and the support included in the phase difference film are arranged in this order.

[8] The polarizing plate according to [6] or [7],
in which a slow axis of the support is parallel to an absorption axis of the polarizer,
the support has 100 to 180 nm of Re1 and 50 to 90 nm of Rth1,
the liquid crystal layer has −10 to 10 nm of Re2 and −150 to −80 nm of Rth2, and
the support and the liquid crystal layer have a reciprocal wavelength dispersibility,
where, Re1 means an in-plane retardation (nm) of the support at a wavelength of 550 nm, Rth1 means a thickness-direction retardation (nm) of the support at a wavelength of 550 nm, Re2 means an in-plane retardation (nm) of the liquid crystal layer at a wavelength of 550 nm, and Rth2 means a thickness-direction retardation (nm) of the liquid crystal layer at a wavelength of 550 nm.

[9] A liquid crystal display device comprising:
the polarizing plate according to any one of [6] to [8]; and
a transverse electric field type liquid crystal cell,
in which, from a viewing side, the polarizer included in the polarizing plate, the liquid crystal layer included in the polarizing plate, the support included in the polarizing plate, and the liquid crystal cell are arranged in this order.

As shown below, according to the present invention, it is possible to provide a phase difference film having excellent alignment without the need for alignment treatment on a support, a method for manufacturing a phase difference film, a polarizing plate, and a liquid crystal display device.

DESCRIPTION OF THE PREFERRED EMBODIMENTS

The description of the constitutional requirements described below is made on the basis of representative embodiments of the present invention, but it should not be construed that the present invention is limited to those embodiments.

In the present specification, the numerical value range expressed by "to" means that the numerical values described before and after "to" are included as a lower limit value and an upper limit value, respectively.

In addition, "orthogonal" and "parallel" with respect to angles mean a range of a strict angle ±10°, and "same" and "different" with respect to the angles can be determined based on whether the difference is less than 5° or not.

In addition, in the present specification, "visible light" means light at 380 to 780 nm. In addition, in the present specification, a measurement wavelength is 550 nm unless otherwise specified.

Next, terms used in the present specification will be described.

<Slow Axis>

In the present specification, "slow axis" means a direction in which the in-plane refractive index is maximum. In addition, the slow axis of the phase difference film is intended to mean a slow axis of the entire phase difference film.

<Tilt Angle>

In the present specification, "tilt angle" (also referred to as an inclination angle) means an angle between a tilted liquid crystalline compound and a plane of a layer, and means the maximum angle among angles between a direction of maximum refractive index in refractive index ellipsoid of the liquid crystalline compound and the plane of the layer. Therefore, in a rod-like liquid crystalline compound having positive optical anisotropy, the tilt angle means an angle between a long axis direction of the rod-like liquid crystalline compound, that is, a director direction and the plane of the layer. In addition, in the present invention, "average tilt angle" means an average value of from the tilt angle at the upper interface of the phase difference film to inclination angle at the lower interface of the phase difference film.

<$Re(\lambda)$ and $Rth(\lambda)$>

In the present specification, "$Re(\lambda)$" and "$Rth(\lambda)$" respectively represent an in-plane retardation at a wavelength $\lambda$ and a thickness-direction retardation at a wavelength $\lambda$.

Here, the values of the in-plane retardation and the thickness-direction retardation refer to values measured using AxoScan OPMF-1 (manufactured by Opto Science, Inc.) with a light having a measurement wavelength.

Specifically, by inputting an average refractive index $((Nx+Ny+Nz)/3)$ and a film thickness (d (µm)) to AxoScan OPMF-1, it is possible to calculate:
Slow axis direction (°)

$$Re(\lambda)=R0(\lambda)$$

$$Rth(\lambda)=((nx+ny)/2-nz)\times d.$$

In addition, $R0(\lambda)$ is expressed in a numerical value calculated with AxoScan OPMF-1, and means $Re(\lambda)$.

[Phase Difference Film]

A phase difference film according to an embodiment of the present invention includes a support and a liquid crystal layer formed of a liquid crystal composition containing a liquid crystalline compound so as to be in contact with the support.

In addition, a surface energy of a surface of the support on which the liquid crystal layer is formed is 45 mN/m or more and a non-polar dispersion force component included in the surface energy is 45 mN/m or more.

In addition, the liquid crystalline compound is immobilized in an aligned state.

In addition, in the phase difference film according to the embodiment of the present invention, a contrast is more than 10000.

The phase difference film according to the embodiment of the present invention has excellent alignment without using a support subjected to an alignment treatment. The details of this reason have not been clarified yet, but it is assumed to be due to the following reasons.

In a case where a support having a predetermined value or more values of a surface energy and a non-polar dispersion force component is used, wettability of the liquid crystal composition is improved and the adhesiveness between the support and the liquid crystal layer is good. In a case where the adhesiveness between the support and the liquid crystal layer is good as described above, the alignment of the liquid crystal composition included in the liquid crystal layer is less likely to be disordered.

In addition, a phase difference film having high contrast is easily obtained in a case where the surface roughness of a surface of the support, on which the liquid crystal layer is formed, is small. As described above, the liquid crystalline compound arranged on the surface of the support having less surface roughness has less disorder in alignment and is more likely to be aligned well.

In this way, it is assumed that the effect that the support has a predetermined value or more values of the surface energy and the non-polar dispersion force component and the effect that the contrast of the phase difference film is high act synergistically to obtain a phase difference film having excellent alignment.

The contrast of the phase difference film is more than 10000, and from the viewpoint that the effects of the present invention are more exhibited, preferably 20000 or more, more preferably 30000 or more, and particularly preferably 50000 or more.

The upper limit value of the contrast of the phase difference film is not particularly limited, but is usually 1000000 or less.

The contrast value of the phase difference film in the present specification is measured according to the method described in Example column described later.

The thickness of the phase difference film is preferably 2 to 210 µm, more preferably 3 to 110 µm, and particularly preferably 5 to 80 µm. In addition, in a case where the phase difference film has a plurality of layers, the thickness of the phase difference film indicates a total entire thickness including the layers.

The phase difference film can be used as an optical member of various display devices and various optical elements such as a light emitting device and a polarizing plate.

[Support]

The support in the present invention is a member having a function as a base material for applying the liquid crystal composition described later.

The surface energy (hereinafter, also simply referred to as a "surface energy") of the surface of the support, on which the liquid crystal layer is formed, is 45 mN/m or more, and from the viewpoint that the effects of the present invention are more exhibited, preferably 47 mN/m or more and more preferably 49 mN/m or more.

The upper limit value of the surface energy is not particularly limited, but is preferably 80 mN/m or less and more preferably 75 mN/m or less.

In addition, the non-polar dispersion force component (hereinafter, also simply referred to as a "dispersion force component") included in the above-described surface energy is 45 mN/m or more, and from the viewpoint that the effects of the present invention are more exhibited, preferably 47 mN/m or more and more preferably 49 mN/m or more.

The upper limit value of the dispersion force component is not particularly limited, but is preferably 80 mN/m or less and more preferably 75 mN/m or less.

In addition, the difference [(surface energy)−(dispersion force component)] between the surface energy and the dispersion force component is preferably 0 to 7 mN/m, more preferably 0 to 5 mN/m, and particularly preferably 0 to 3 mN/m. According to this, a hydrophobic liquid crystal composition is easy to wet and spread on the support, so that the adhesiveness between the support and the liquid crystal layer is further improved and a phase difference film having more excellent alignment is obtained.

Here, the surface energy ($\gamma s^v$: unit, mN/m) and the dispersion force component ($\gamma s^d$: unit, mN/m) can be experimentally obtained by using pure water $H_2O$ and methylene iodide $CH_2I_2$ on the surface of the support to be measured, with reference to D. K. Owens: J. Appl. Polym. Sci., 13, 1741 (1969). In this case, in a case where the contact angles of pure water and methylene iodide are respectively defined as $\theta_{H2O}$ and $\theta_{CH2I2}$, $\gamma s^d$ and $\gamma s^h$ (polar component: unit, mN/m) are obtained from Simultaneous equations (SA) and (SB), and the surface energy is defined as a value $\gamma s^v$ (=$\gamma s^d$+$\gamma s^h$) represented by the sum thereof. In addition, as the contact angle, a value obtained by controlling the humidity under an environment of a temperature of 20° C. to 27° C. and a relative humidity of 50% to 65% for 2 hours or more, and then measuring under an environment of a temperature of 25° C. and a relative humidity of 60% is adopted, and the contact angle can be measured using a contact angle meter (for example, Dropmaster (manufactured by Kyowa Interface Science Co., LTD.)).

$$1+\cos\theta_{H2O}=2\sqrt{\gamma s^d}(\sqrt{\gamma_{H2O}^d}/\sqrt{\gamma_{H2O}^v})+2\sqrt{\gamma s^h}(\sqrt{\gamma_{H2O}^h}/\sqrt{\gamma_{H2O}^v}) \quad (SA)$$

$$1+\cos\theta_{CH2I2}=2\sqrt{\gamma s^d}(\sqrt{\gamma_{CH2I2}^d}/\sqrt{\gamma_{CH2I2}^v})+2\sqrt{\gamma s^h}(\sqrt{\gamma_{CH2I2}^h}/\sqrt{\gamma_{CH2I2}^v}) \quad (SB)$$

(here, $\gamma_{H2O}^d$=21.8, $\gamma_{H2O}^h$=51.0, $\gamma_{H2O}^v$=72.8, $\gamma_{CH2I2}^d$=49.5, $\gamma_{CH2I2}^h$=1.3, and $\gamma_{CH2I2}^v$=50.8)

As the material constituting the support, it is sufficient to use a material in which the surface energy and the dispersion force component satisfy the above-described values even in a case where the support is not subjected to an alignment treatment. Among such materials, from the viewpoint of satisfying the numerical ranges of Re1 and Rth1 described later, from the viewpoint of having reciprocal wavelength dispersibility, from the viewpoint that the phase difference film has more excellent alignment, and from the viewpoint that the adhesiveness between the support and the liquid crystal layer is more excellent, polycarbonate is preferable. The definition of reciprocal wavelength dispersibility will be described later.

The support is preferably transparent. The term "transparent" in the present invention indicates that the transmittance of visible light is 60% or more, preferably 80% or more and more preferably 90% or more.

The thickness of the support is not particularly limited, but is preferably 1 to 200 µm and more preferably 2 to 100 µm.

The phase difference film is preferably a positive A-plate.

In the present specification, the positive A-plate is defined as follows. The positive A-plate satisfies a relationship of Expression (A1) in a case where a refractive index in the slow axis direction in a film plane (in a direction such that the in-plane refractive index is maximum) is defined as nx, a refractive index in the in-plane direction orthogonal to the in-plane slow axis is defined as ny, and a thickness-direction refractive index is defined as nz. In the positive A-plate, Rth indicates a positive value.

$$nx > ny \approx nz \quad \text{Expression (A1)}$$

The symbol "≈" encompasses not only a case where the both are completely the same as each other but also a case where the both are substantially the same as each other. As the expression "substantially the same", for example, "ny≈nz" includes a case where (ny−nz)×d (here, d is a thickness of the film) is −10 to 10 nm, preferably −5 to 5 nm.

[Liquid Crystal Layer]

The liquid crystal layer in the present invention is formed on the surface of the support so as to be in contact with the support. That is, there is no other member (for example, a so-called alignment film) between the support and the liquid crystal layer.

In the liquid crystal layer, the liquid crystalline compound is immobilized in an aligned state, and in this case, the liquid crystalline compound no longer needs to exhibit liquid crystallinity.

From the viewpoint of improving the contrast, it is preferable that the liquid crystal layer exhibits smectic properties. That is, it is preferable that the liquid crystalline compound included in the liquid crystal composition used for forming the liquid crystal layer is immobilized in a state of a smectic phase.

The thickness of the liquid crystal layer is preferably 1 to 5 µm, more preferably 1 to 4 µm, and particularly preferably 1 to 3 µm.

<Liquid Crystal Composition>

The liquid crystal layer in the present invention is formed by using a liquid crystal composition containing a liquid crystalline compound.

(Liquid Crystalline Compound)

The liquid crystalline compound is not particularly limited as long as the liquid crystalline compound is a compound exhibiting liquid crystallinity, but from the viewpoint that the effects of the present invention are more exhibited, a polymerizable liquid crystal compound is preferable.

The type of the polymerizable liquid crystal compound is not particularly limited, but the types are classified into a rod-shaped type (rod-like liquid crystalline compound) and a disk-shaped type (disk-like liquid crystalline compound, discotic liquid crystalline compound) from the shapes. Each of the types can further be classified into a low-molecular-weight type and a high-molecular-weight type. A high molecule generally refers to a molecule having a polymerization degree of 100 or more (Masao Doi; Polymer Physics-Phase Transition Dynamics, 1992, IWANAMI SHOTEN, PUBLISHERS, page 2). In the present invention, any liquid crystalline compound can be used. Two or more kinds of rod-like liquid crystalline compounds, two or more kinds of disk-like liquid crystalline compounds, or a mixture of the rod-like liquid crystalline compound and the disk-like liquid crystalline compound may be used.

Among these, a rod-like liquid crystalline compound is preferably used. This is because that, by the homeotropic (vertical) alignment of the rod-like liquid crystalline compound, there is an advantage that the formed liquid crystal layer can easily function as a positive C-plate.

In the present specification, the positive C-plate is defined as follows. The positive C-plate satisfies a relationship of Expression (C1) in a case where a refractive index in the slow axis direction in the liquid crystal layer (in a direction such that the in-plane refractive index is maximum) is defined as nx, a refractive index in the in-plane direction orthogonal to the in-plane slow axis is defined as ny, and a thickness-direction refractive index is defined as nz. In the positive C-plate, Rth exhibits a negative value.

$$nx \approx ny < nz \qquad \text{Expression (C1)}$$

The symbol "≈" encompasses not only a case where the both are completely the same as each other but also a case where the both are substantially the same as each other. As the expression "substantially the same", for example, "nx≈ny" includes a case where (nx−ny)×d (here, d is a thickness of the film) is 0 to 10 nm, preferably 0 to 5 nm.

The polymerizable liquid crystal compound in the present specification refers to a liquid crystalline compound having a polymerizable group. The type of the polymerizable group is not particularly limited, but a polymerizable group capable of radical polymerization or cationic polymerization is preferable. Specific examples of a radically polymerizable group and a cationically polymerizable group are as described in Formula (I) described later.

From the viewpoint that the effects of the present invention are more exhibited, the polymerizable liquid crystal compound is preferably a polymerizable liquid crystal compound having a reciprocal wavelength dispersibility.

Here, "reciprocal wavelength dispersibility" in the present specification refers to that, in a case where the in-plane retardation (Re) value of a layer (film) at a specific wavelength (visible range) is measured, the absolute value of the Re value or the Rth value is equal or higher as the measurement wavelength increases, and refers to that a relationship of Re(450)≤Re(550)≤Re (650) or |Rth(450)|≤|Rth(550) |≤|Rth(650)| is satisfied. In addition, the polymerizable compound having reciprocal wavelength dispersibility refers to that a layer (film) produced using this polymerizable compound satisfies the above-described relationship.

As the polymerizable liquid crystal compound having reciprocal wavelength dispersibility, a compound represented by Formula (I) is preferable.

$$L^1\text{-}SP^1\text{-}A^1\text{-}D^3\text{-}G^1\text{-}D^1\text{-}Ar\text{-}D^2\text{-}G^2\text{-}D^4\text{-}A^2\text{-}SP^2\text{-}L^2 \qquad \text{(I)}$$

In Formula (I), $D^1$, $D^2$, $D^3$, and $D^4$ each independently represent a single bond, —CO—O—, —C(=S)O—, —CR$^1$R$^2$—, —CR$^1$R$^2$—CR$^3$R$^4$—, —O—CR$^1$R$^2$—, —CR$^1$R$^2$—O—CR$^3$R$^4$—, —CO—O—CR$^1$R$^2$—, —O—CO—CR$^1$R$^2$—, —CR$^1$R$^2$—O—CO—CR$^3$R$^4$—, —CR$^1$R$^2$—CO—O—CR$^3$R$^4$—, —NR$^1$—CR$^2$R$^3$—, or —CO—NR$^1$—. R$^1$, R$^2$, R$^3$, and R$^4$ each independently represent a hydrogen atom, a fluorine atom, or an alkyl group having 1 to 4 carbon atoms.

In addition, in Formula (I), $G^1$ and $G^2$ each independently represent a divalent alicyclic hydrocarbon group having 5 to 8 carbon atoms, and one or more —CH$_2$— groups constituting the alicyclic hydrocarbon group may be replaced with —O—, —S— or —NH—.

In addition, in Formula (I), $A^1$ and $A^2$ each independently represent an aromatic ring having 6 or more carbon atoms or a cycloalkane ring having 6 or more carbon atoms.

In addition, in Formula (I), $SP^1$ and $SP^2$ each independently represent a single bond, a linear or branched alkylene group having 1 to 12 carbon atoms, or a divalent linking group in which one or more —CH$_2$— groups constituting the linear or branched alkylene group having 1 to 12 carbon atoms are replaced with —O—, —S—, —NH—, —N(Q)-, or —CO—, in which Q represents a substituent.

In addition, in Formula (I), $L^1$ and $L^2$ each independently represent a monovalent organic group, and at least one of $L^1$ or $L^2$ represents a polymerizable group. Here, in a case where Ar is an aromatic ring represented by (Ar-3), at least one of $L^1$ or $L^2$, or $L^3$ or $L^4$ in Formula (Ar-3) represents a polymerizable group.

In Formula (I), as the divalent alicyclic hydrocarbon group having 5 to 8 carbon atoms represented by $G^1$ and $G^2$, a 5-membered ring or a 6-membered ring is preferable. In addition, the alicyclic hydrocarbon group may be saturated or unsaturated, but a saturated alicyclic hydrocarbon group is preferable. As the divalent alicyclic hydrocarbon group represented by $G^1$ and $G^2$, for example, the description of paragraph "0078" of JP2012-021068A can be referred to, the contents of which are incorporated herein by reference.

In Formula (I), examples of the aromatic ring having 6 or more carbon atoms represented by $A^1$ and $A^2$ include aromatic hydrocarbon rings such as a benzene ring, a naphthalene ring, an anthracene ring, and a phenanthroline ring; and aromatic heterocyclic rings such as a furan ring, a pyrrole ring, a thiophene ring, a pyridine ring, a thiazole ring, and a benzothiazole ring. Among these, a benzene ring (for example, a 1,4-phenyl group) is preferable.

In addition, in Formula (I), examples of the cycloalkane ring having 6 or more carbon atoms represented by $A^1$ and $A^2$ include a cyclohexane ring, a cyclopeptane ring, a cyclooctane ring, a cyclododecane ring, and a cyclodocosane ring. Among these, a cyclohexane ring (for example, a cyclohexane-1,4-diyl group) is preferable.

In Formula (I), suitable examples of the linear or branched alkylene group having 1 to 12 carbon atoms represented by SP' and SP$^2$ include a methylene group, an ethylene group, a propylene group, a butylene group, a pentylene group, a hexylene group, a methylhexylene group, and a heptylene group. As described above, SP$^1$ and SP$^2$ may be a divalent linking group in which one or more —CH$_2$— groups constituting the linear or branched alkylene group having 1 to 12 carbon atoms are replaced with —O—, —S—, —NH—, —N(Q)-, or —CO—, and examples of the substituent represented by Q include the same substituents which may be included in Y$^1$ in Formula (Ar-1) described later.

In Formula (I), examples of the monovalent organic group represented by $L^1$ and $L^2$ include an alkyl group, an aryl group, and a heteroaryl group. The alkyl group may be linear, branched, or cyclic, but is preferably linear. The number of carbon atoms of the alkyl group is preferably 1 to 30, more preferably 1 to 20, and still more preferably 1 to 10. In addition, the aryl group may be monocyclic or polycyclic, but is preferably monocyclic. The number of carbon atoms of the aryl group is preferably 6 to 25 and more preferably 6 to 10. In addition, the heteroaryl group may be monocyclic or polycyclic. The number of heteroatoms constituting the heteroaryl group is preferably 1 to 3. The heteroatom constituting the heteroaryl group is preferably a nitrogen atom, a sulfur atom, or an oxygen atom. The number of carbon atoms of the heteroaryl group is preferably 6 to 18 and more preferably 6 to 12. In addition, the alkyl group, the aryl group, and the heteroaryl group may be unsubstituted or have a substituent. Examples of the substituent include the same substituents which may be included in $Y^1$ in Formula (Ar-1) described later.

In Formula (I), the polymerizable group represented by at least one of $L^1$ or $L^2$ is not particularly limited, but is preferably a polymerizable group capable of radical polymerization or cationic polymerization.

A generally known radically polymerizable group can be used as the radically polymerizable group, and suitable examples thereof include an acryloyl group and a methacryloyl group. In this case, it is known that an acryloyl group generally has a high polymerization rate, and from the viewpoint of improving productivity, an acryloyl group is preferable. However, a methacryloyl group can also be used as the polymerizable group.

A generally known cationically polymerizable group can be used as the cationically polymerizable group, and specific examples thereof include an alicyclic ether group, a cyclic acetal group, a cyclic lactone group, a cyclic thioether group, a spiro orthoester group, and a vinyloxy group. Among those, an alicyclic ether group or a vinyloxy group is preferable, and an epoxy group, an oxetanyl group, or a vinyloxy group is particularly preferable.

Particularly preferred examples of the polymerizable group include the following groups.

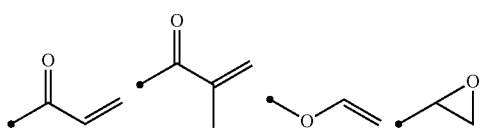

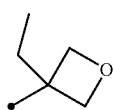

In Formula (I), from the reason that durability is good, it is preferable that both of L and $L^2$ in Formula (I) are polymerizable groups, and it is more preferable that $L^1$ and $L^2$ are an acryloyl group or a methacryloyl group.

On the other hand, in Formula (I), Ar represents any aromatic ring selected from the group consisting of groups represented by Formulae (Ar-1) to (Ar-5). In Formulae (Ar-1) to (Ar-5), * represents a bonding position to $D^1$ or $D^2$ in Formula (I).

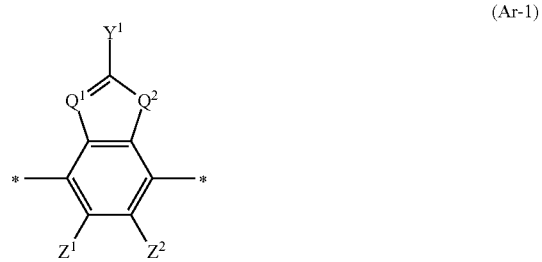

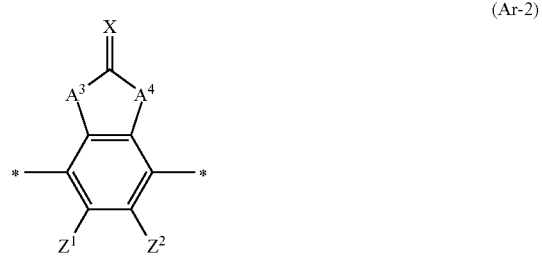

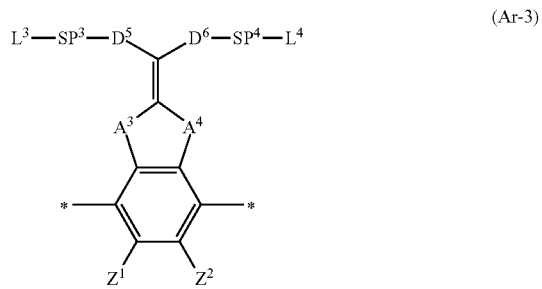

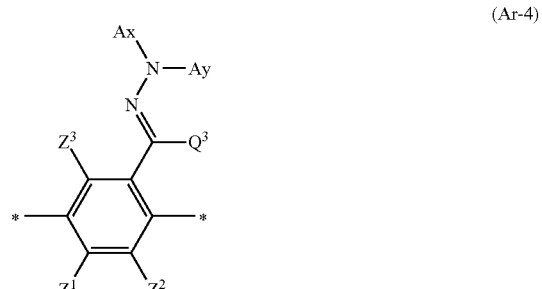

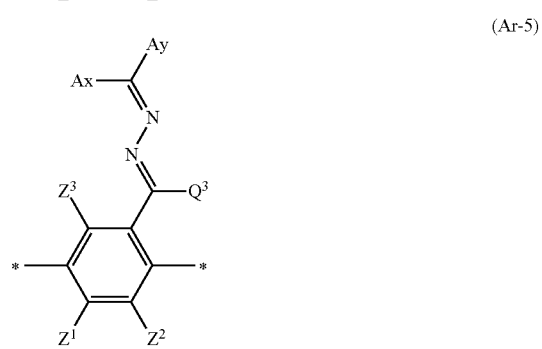

Here, in Formula (Ar-1), $Q^1$ represents N or CH, $Q^2$ represents —S—, —O—, or —N($R^5$)—, in which $R^5$ represents a hydrogen atom or an alkyl group having 1 to 6 carbon atoms, and $Y^1$ represents an aromatic hydrocarbon group having 6 to 12 carbon atoms or an aromatic heterocyclic group having 3 to 12 carbon atoms, which may have a substituent.

Specific examples of the alkyl group having 1 to 6 carbon atoms represented by $R^5$ include a methyl group, an ethyl group, a propyl group, an isopropyl group, an n-butyl group, an isobutyl group, a sec-butyl group, a tert-butyl group, an n-pentyl group, and an n-hexyl group.

Examples of the aromatic hydrocarbon group having 6 to 12 carbon atoms represented by $Y^1$ include aryl groups such as a phenyl group, a 2,6-diethylphenyl group, and a naphthyl group.

Examples of the aromatic heterocyclic group having 3 to 12 carbon atoms represented by $Y^1$ include heteroaryl groups such as a thienyl group, a thiazolyl group, a furyl group, and a pyridyl group.

In addition, examples of the substituent which may be included in $Y^1$ include an alkyl group, an alkoxy group, and a halogen atom.

As the alkyl group, for example, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, a cyclohexyl group, and the like) is more preferable, an alkyl group having 1 to 4 carbon atoms is still more preferable, and a methyl group or an ethyl group is particularly preferable.

As the alkoxy group, for example, an alkoxy group having 1 to 18 carbon atoms is preferable, an alkoxy group having 1 to 8 carbon atoms (for example, a methoxy group, an ethoxy group, an n-butoxy group, a methoxyethoxy group, and the like) is more preferable, an alkoxy group having 1 to 4 carbon atoms is still more preferable, and a methoxy group or an ethoxy group is particularly preferable.

Examples of the halogen atom include a fluorine atom, a chlorine atom, a bromine atom, and an iodine atom, and among these, a fluorine atom or a chlorine atom is preferable.

In addition, in Formulae (Ar-1) to (Ar-5), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, $-OR^6$, $-NR^7R^8$, or $-SR^9$, in which $R^6$ to $R^9$ each independently represent a hydrogen atom or an alkyl group having 1 to 6 carbon atoms, and $Z^1$ and $Z^2$ may be bonded to each other to form an aromatic ring.

As the monovalent aliphatic hydrocarbon group having 1 to 20 carbon atoms, an alkyl group having 1 to 15 carbon atoms is preferable, an alkyl group having 1 to 8 carbon atoms is more preferable, and specifically, a methyl group, an ethyl group, an isopropyl group, a tert-pentyl group (1,1-dimethylpropyl group), a tert-butyl group, or 1,1-dimethyl-3,3-dimethyl-butyl group is still more preferable and a methyl group, an ethyl group, or a tert-butyl group is particularly preferable.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, and a cyclodecadiene group; and polycyclic saturated hydrocarbon groups such as a bicyclo[2.2.1]heptyl group, a bicyclo[2.2.2]octyl group, a tricyclo[5.2.1.0$^{2,6}$]decyl group, a tricyclo[3.3.1.1$^{3,7}$]decyl group, a tetracyclo[6.2.1.1$^{3,6}$.0$^{2,7}$]dodecyl group, and an adamantyl group.

Specific examples of the monovalent aromatic hydrocarbon group having 6 to 20 carbon atoms include a phenyl group, a 2,6-diethylphenyl group, a naphthyl group, and a biphenyl group, and an aryl group having 6 to 12 carbon atoms (particularly, a phenyl group) is preferable.

Examples of the halogen atom include a fluorine atom, a chlorine atom, a bromine atom, and an iodine atom, and among these, a fluorine atom, a chlorine atom, or a bromine atom is preferable.

On the other hand, specific examples of the alkyl group having 1 to 6 carbon atoms represented by $R^6$ to $R^9$ include a methyl group, an ethyl group, a propyl group, an isopropyl group, an n-butyl group, an isobutyl group, a sec-butyl group, a tert-butyl group, an n-pentyl group, and an n-hexyl group.

In addition, in Formulae (Ar-2) and (Ar-3), $A^3$ and $A^4$ each independently represent a group selected from the group consisting of $-O-$, $-N(R^{10})-$, $-S-$, and $-CO-$, in which $R^{10}$ represents a hydrogen atom or a substituent.

Examples of the substituent represented by $R^{10}$ include the same substituents which may be included in $Y^1$ in Formula (Ar-1).

In addition, in Formula (Ar-2), X represents a hydrogen atom or a non-metal atom of Groups 14 to 16 to which a substituent may be bonded.

In addition, examples of the non-metal atom of Groups 14 to 16 represented by X include an oxygen atom, a sulfur atom, a nitrogen atom having a substituent, and a carbon atom having a substituent, and specific examples of the substituent include an alkyl group, an alkoxy group, an alkyl-substituted alkoxy group, a cyclic alkyl group, an aryl group (for example, a phenyl group, a naphthyl group, and the like), a cyano group, an amino group, a nitro group, an alkylcarbonyl group, a sulfo group, and a hydroxyl group.

In addition, in Formula (Ar-3), $D^5$ and $D^6$ each independently represent a single bond, $-CO-O-$, $-C(=S)O-$, $-CR^1R^2-$, $-CR^1R^2-CR^3R^4-$, $-O-CR^1R^2-$, $-CR^1R^2-O-CR^3R^4-$, $-CO-O-CR^1R^2-$, $-O-CO-CR^1R^2-$, $-CR^1R^2-O-CO-CR^3R^4-$, $-CR^1R^2-CO-O-CR^3R^4-$, $-NR^1-CR^2R^3-$, or $-CO-NR^1-$. $R^1$, $R^2$, $R^3$, and $R^4$ each independently represent a hydrogen atom, a fluorine atom, or an alkyl group having 1 to 4 carbon atoms.

In addition, in Formula (Ar-3), $SP^3$ and $SP^4$ each independently represent a single bond, a linear or branched alkylene group having 1 to 12 carbon atoms, or a divalent linking group in which one or more $-CH_2-$ groups constituting the linear or branched alkylene group having 1 to 12 carbon atoms are replaced with $-O-$, $-S-$, $-NH-$, $-N(Q)-$, or $-CO-$, in which Q represents a substituent. Examples of the substituent include the same substituents which may be included in $Y^1$ in Formula (Ar-1).

In addition, in Formula (Ar-3), $L^3$ and $L^4$ each independently represent a monovalent organic group, and at least one of $L^3$ or $L^4$, or $L^1$ or $L^2$ in Formula (I) represents a polymerizable group.

Examples of the monovalent organic group include the same monovalent organic groups described in $L^1$ and $L^2$ in Formula (I).

In addition, Examples of the polymerizable group include the same polymerizable groups described in $L^1$ and $L^2$ in Formula (I).

In addition, in Formulae (Ar-4) and (Ar-5), Ax represents an organic group having 2 to 30 carbon atoms, which has at least one aromatic ring selected from the group consisting of an aromatic hydrocarbon ring and an aromatic heterocyclic ring.

In addition, in Formulae (Ar-4) and (Ar-5), Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring.

Here, the aromatic rings in Ax and Ay may have a substituent, and Ax and Ay may be bonded to each other to form a ring.

In addition, $Q^3$ represents a hydrogen atom or an alkyl group having 1 to 6 carbon atoms, which may have a substituent.

Examples of Ax and Ay include those described in paragraphs "0039" to "0095" of WO2014/010325A.

In addition, specific examples of the alkyl group having 1 to 6 carbon atoms represented by $Q^3$ include a methyl group, an ethyl group, a propyl group, an isopropyl group, an n-butyl group, an isobutyl group, a sec-butyl group, a tert-butyl group, an n-pentyl group, and an n-hexyl group, and examples of the substituent include the same substituents which may be included in $Y^1$ in Formula (Ar-1).

Specific examples of the compound represented by Formula (I) include the compound represented by General Formula (I) described in JP2008-297210A (particularly, compounds described in paragraphs "0034" to "0039"), the compound represented by General Formula (1) described in JP2010-084032A (particularly, compounds described in paragraphs "0067" to "0073"), the compound represented by General Formula (II) described in JP2016-053709A (particularly, compounds described in paragraphs "0036" to "0043"), and the compound represented by General Formula (1) described in JP2016-081035A (particularly, compounds described in paragraphs "0043" to "0055").

In the present invention, from the reason that the reciprocal wavelength dispersibility is improved, as the compound represented by Formula (I), a polymerizable liquid crystal compound in which $A^1$ and $A^2$ in Formula (I) each independently represent a cycloalkane ring having 6 or more carbon atoms may be used, and among these, a polymerizable liquid crystal compound in which $A^1$ and $A^2$ in Formula (I) each independently represent a cycloalkane ring having 6 or more carbon atoms and both of $D^3$ and $D^4$ in Formula (I) represent a single bond is preferable.

Suitable examples of such a polymerizable liquid crystal compound include compounds represented by Formulae (1) to (12), and specifically compounds of Formulae (1) to (12), which have side chain structures shown in Tables 1 and 2 as K (side chain structure).

In Tables 1 and 2, * shown in the side chain structure of K represents a bonding position to the aromatic ring.

In addition, in the following description, a compound represented by Formula (1) and having a group shown as 1-1 in Table 1 is denoted as "Compound (1-1-1)", and compounds having other structural formulae and groups are also denoted in the same manner. For example, a compound represented by Formula (2) and having a group shown as 2-3 in Table 2 can be denoted as "Compound (2-2-3)".

In addition, in the side chain structures shown as 1-2 in Table 1 and 2-2 in Table 2, a group adjacent to each of the acryloyloxy group and the methacryloyl group represents a propylene group (a group in which a methyl group is replaced with an ethylene group), and represents a mixture of regioisomers in which the position of the methyl group is different.

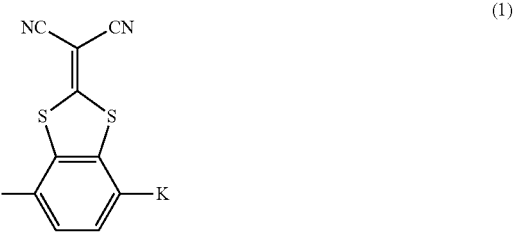

(1)

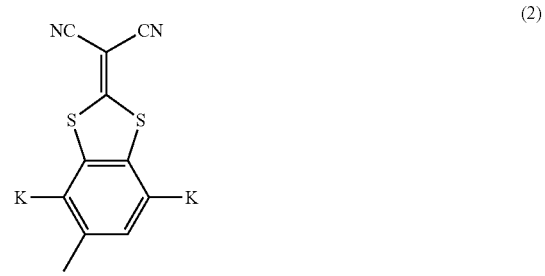

(2)

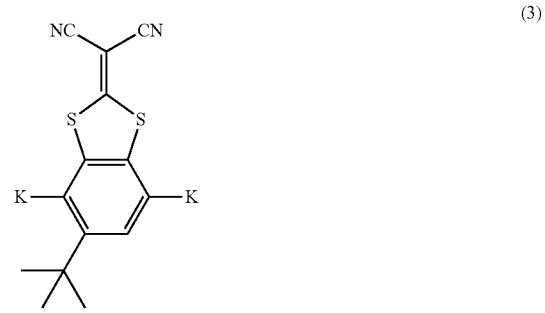

(3)

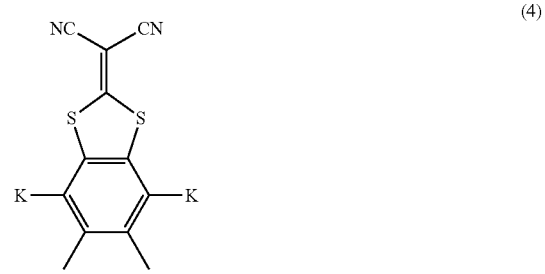

(4)

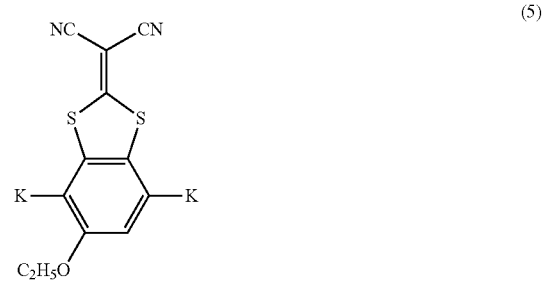

(5)

(6)
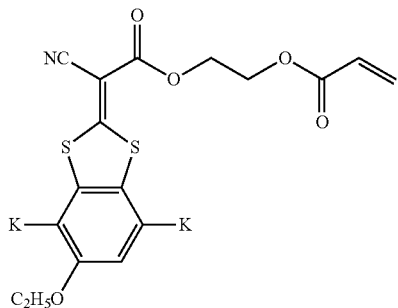
(7)
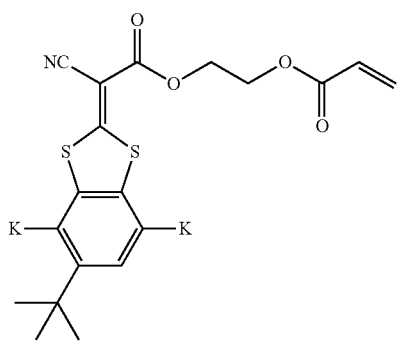
(8)
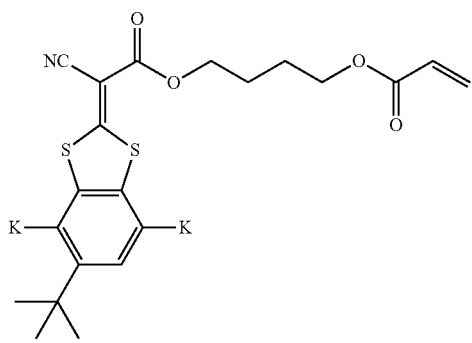
(9)
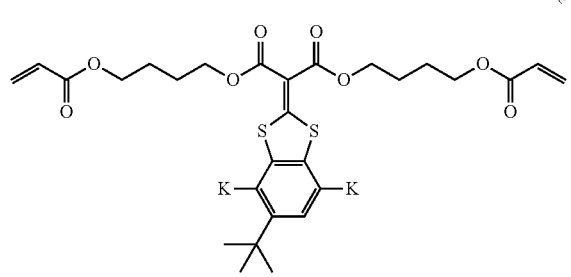
(10)
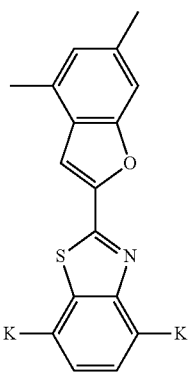
(11)
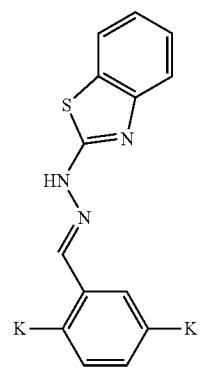
(12)
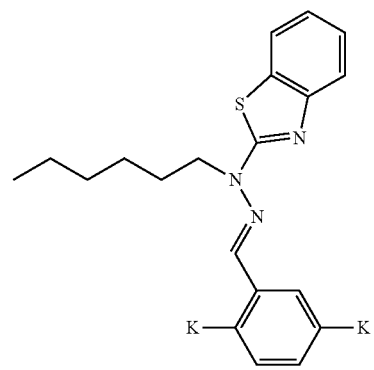
TABLE 1
| K (side chain structure) |
| --- |
| 1-1 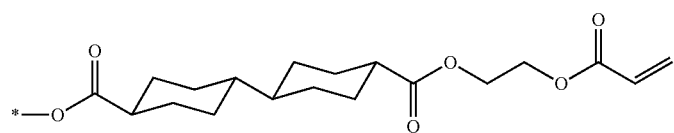 [SMILES: *OC(=O)C1CCC(C2CCC(C(=O)OCCOC(=O)C=C)CC2)CC1] |

TABLE 1-continued
| | K (side chain structure) |
|---|---|
| 1-2 | 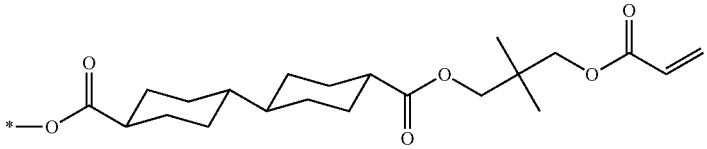 [SMILES: *OC(=O)C1CCC(C2CCC(C(=O)OCC(C)(C)COC(=O)C=C)CC2)CC1] |
| 1-3 | 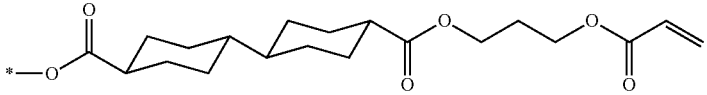 [SMILES: *OC(=O)C1CCC(C2CCC(C(=O)OCCCOC(=O)C=C)CC2)CC1] |
| 1-4 | 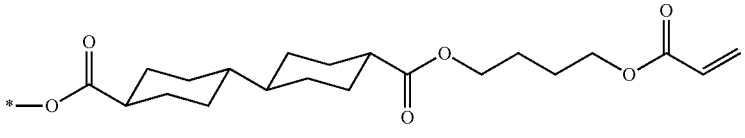 [SMILES: *OC(=O)C1CCC(C2CCC(C(=O)OCCCCOC(=O)C=C)CC2)CC1] |
| 1-5 | 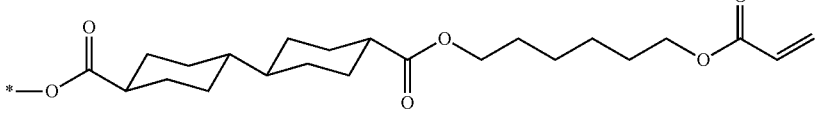 |
| 1-6 | 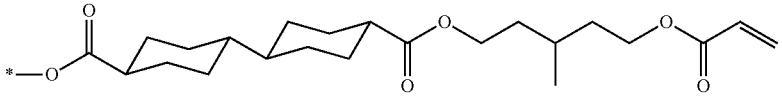 [SMILES: *OC(=O)C1CCC(C2CCC(C(=O)OCCC(C)CCOC(=O)C=C)CC2)CC1] |
| 1-7 | 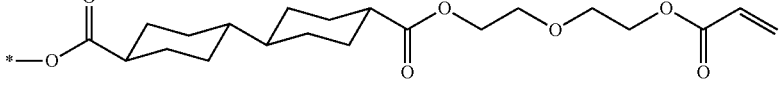 |
| 1-8 | 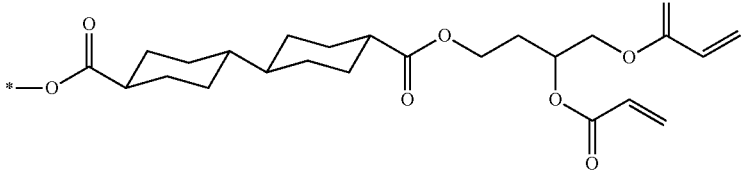 |
| 1-9 | 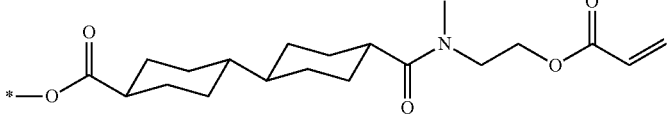 |
| 1-10 | 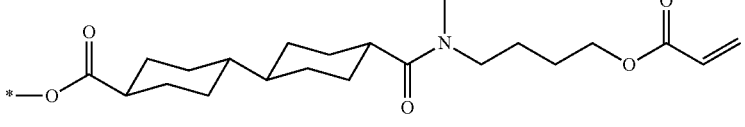 |
| 1-11 | 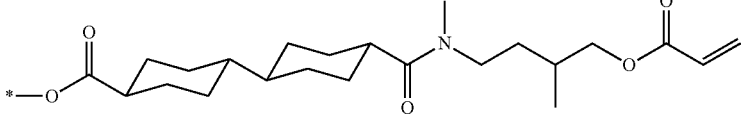 |
| 1-12 | 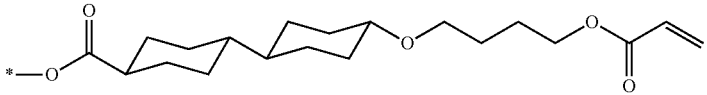 [SMILES: *OC(=O)C1CCC(C2CCC(OCCCCOC(=O)C=C)CC2)CC1] |

TABLE 1-continued
K (side chain structure)
1-13
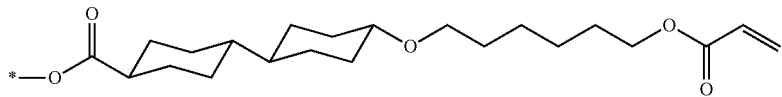 [SMILES: *OC(=O)C1CCC(C2CCC(OCCCCCCOC(=O)C=C)CC2)CC1]
TABLE 2
K (side chain structure)
2-1
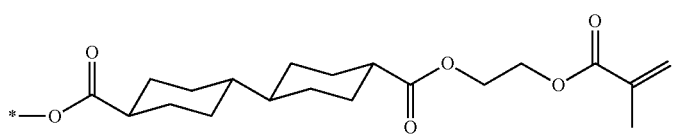 [SMILES: *OC(=O)C1CCC(C2CCC(C(=O)OCCOC(=O)C(=C)C)CC2)CC1]
2-2
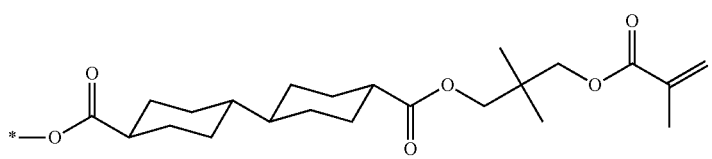 [SMILES: *OC(=O)C1CCC(C2CCC(C(=O)OCC(C)(C)COC(=O)C(=C)C)CC2)CC1]
2-3
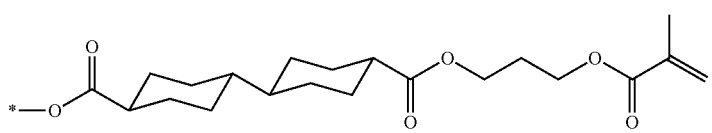 [SMILES: *OC(=O)C1CCC(C2CCC(C(=O)OCCCOC(=O)C(=C)C)CC2)CC1]
2-4
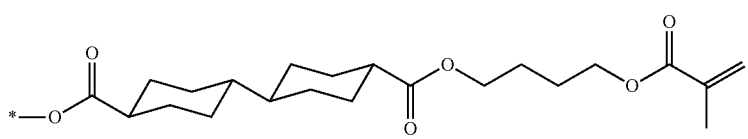 [SMILES: *OC(=O)C1CCC(C2CCC(C(=O)OCCCCOC(=O)C(=C)C)CC2)CC1]
2-5
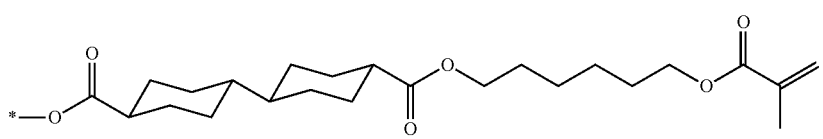 [SMILES: *OC(=O)C1CCC(C2CCC(C(=O)OCCCCCCOC(=O)C(=C)C)CC2)CC1]
2-6
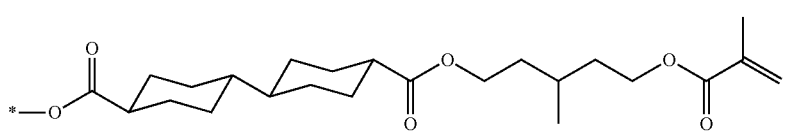 [SMILES: *OC(=O)C1CCC(C2CCC(C(=O)OCCC(C)CCOC(=O)C(=C)C)CC2)CC1]
2-7
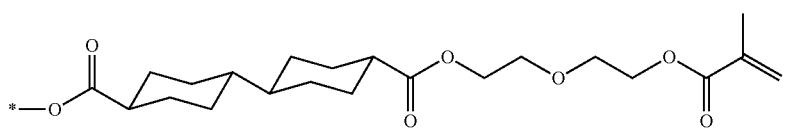 [SMILES: *OC(=O)C1CCC(C2CCC(C(=O)OCCOCCOC(=O)C(=C)C)CC2)CC1]
2-8
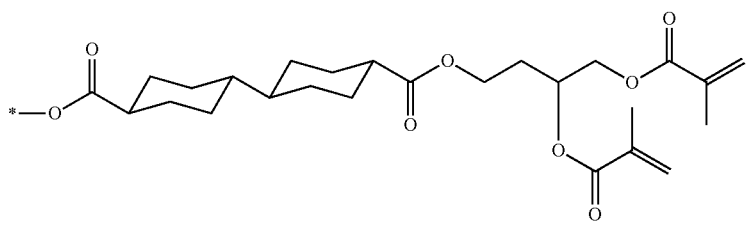 [SMILES: *OC(=O)C1CCC(C2CCC(C(=O)OCCC(COC(=O)C(=C)C)OC(=O)C(=C)C)CC2)CC1]

TABLE 2-continued

K (side chain structure)

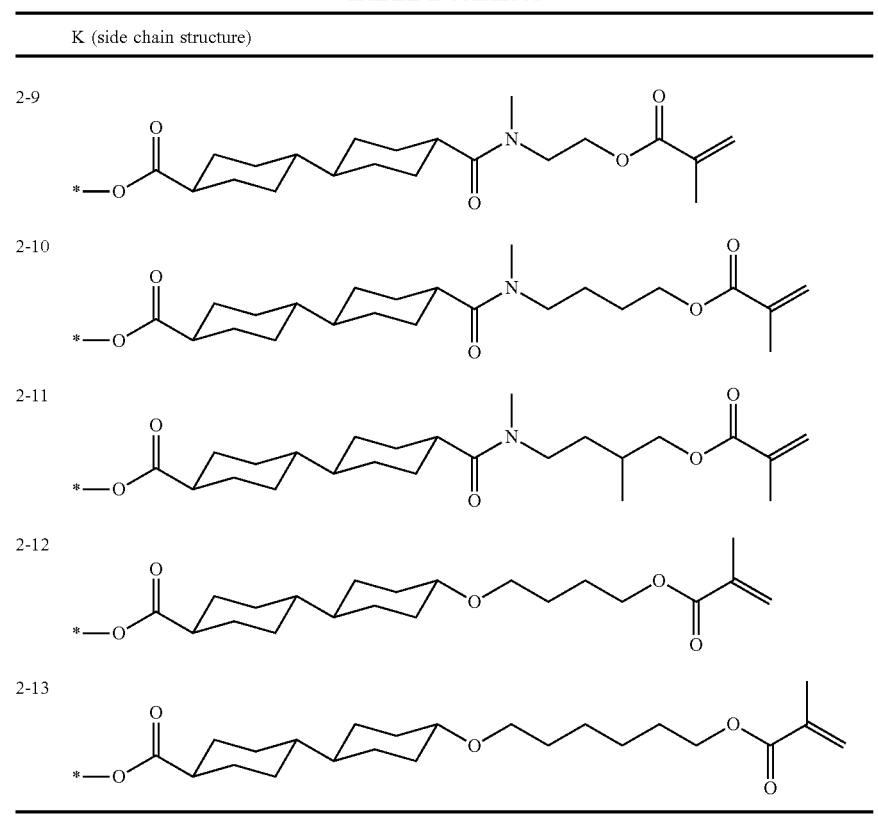

The content of the liquid crystalline compound is preferably 50% to 99% by mass and more preferably 60% to 99% by mass with respect to the total solid content of the liquid crystal composition.

The total solid content of the liquid crystal composition means the total mass of components excluding a solvent.

(Polymerizable Rod-Like Compound)

The liquid crystal composition may contain a polymerizable rod-like compound having no reciprocal wavelength dispersibility. This polymerizable rod-like compound may or may not have liquid crystallinity. Therefore, a polymerizable rod-like compound having liquid crystallinity can be classified into the above-described liquid crystalline compound.

By adding a polymerizable rod-like compound, liquid crystal alignment of the liquid crystal composition can be controlled.

In particular, as the polymerizable rod-like compound, a compound having a structure of Formula (I) described in JP2015-163596A, which has liquid crystallinity, can be preferably used.

The content of the polymerizable rod-like compound is preferably 0 to 80 parts by mass and more preferably 0 to 70 parts by mass with respect to 100 parts by mass of the polymerizable liquid crystal compound having reciprocal wavelength dispersibility.

The polymerizable rod-like compound may be used alone or in combination of two or more thereof.

(Other Polymerizable Compounds)

The liquid crystal composition may contain other polymerizable compounds in addition to the above-described polymerizable liquid crystal compound having reciprocal wavelength dispersibility and the above-described polymerizable rod-like compound. The other polymerizable compounds may or may not have liquid crystallinity. Therefore, among the other polymerizable compounds, other polymerizable compounds having liquid crystallinity can also be classified into the above-described liquid crystalline compound.

Here, a polymerizable group included in the other polymerizable compounds is not particularly limited, and examples thereof include a (meth)acryloyl group, a vinyl group, a styryl group, and an allyl group. Among those, it is preferable to have a (meth)acryloyl group.

From the reason that durability of the phase difference film is improved, a polymerizable compound having 2 to 4 polymerizable groups is preferable, and a polymerizable compound having two polymerizable groups is more preferable.

Specific examples of the other polymerizable compounds include compounds represented by Formulae (M1), (M2), and (M3) described in paragraphs "0030" to "0033" of JP2014-077068A, which have liquid crystallinity, and more specifically, specific examples described in paragraphs "0046" to "0055" of the same publication.

In addition, examples of a compound having no liquid crystallinity include polyfunctional acrylates such as polyethylene glycol diacrylate.

The content of the other polymerizable compounds is preferably 0 to 80 parts by mass and more preferably 0 to 70 parts by mass with respect to 100 parts by mass of the polymerizable liquid crystal compound having reciprocal wavelength dispersibility.

The other polymerizable compounds may be used alone or in combination of two or more thereof.

(Boronic Acid Monomer)

The liquid crystal composition preferably contains a boronic acid monomer having a polymerizable group and a boronic acid group represented by Formula (B). The boronic acid monomer is used as a kind of vertical alignment agent and adhesion improver.

In a case where the liquid crystal composition contains a boronic acid monomer, the effects of improving the adhesiveness between the support and the liquid crystal layer, improving the contrast of the phase difference film, reducing light leak of a liquid crystal display device, and the like can be achieved.

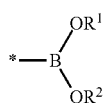

(B)

In Formula (B), $R^1$ and $R^2$ each independently represent a hydrogen atom, a substituted or unsubstituted aliphatic hydrocarbon group, an aryl group, or a heterocyclic group.

Examples of the aliphatic hydrocarbon group include a linear or branched alkyl group having 1 to 20 carbon atoms, which may be substituted or unsubstituted, (for example, a methyl group, an ethyl group, an iso-propyl group, and the like), a substituted or unsubstituted cyclic alkyl group having 3 to 20 carbon atoms (for example, a cyclohexyl group and the like), and an alkenyl group having 2 to 20 carbon atoms (for example, a vinyl group and the like).

Examples of the aryl group include a substituted or unsubstituted phenyl group having 6 to 20 carbon atoms (for example, a phenyl group, a tolyl group, and the like), and a substituted or unsubstituted naphthyl group having 10 to 20 carbon atoms.

The heterocyclic group is, for example, a substituted or unsubstituted 5-membered or 6-membered ring group including at least one heteroatom (for example, a nitrogen atom, an oxygen atom, a sulfur atom, and the like), and examples thereof include a pyridyl group, an imidazolyl group, a furyl group, a piperidyl group, and a morpholino group. $R^1$ and $R^2$ may be linked to each other to form a ring. For example, isopropyl groups of $R^1$ and $R^2$ may be linked to each other to form a 4,4,5,5-tetramethyl-1,3,2-dioxaborolane ring.

In Formula (B), as $R^1$ and $R^2$, a hydrogen atom, a linear or branched alkyl group having 1 to 3 carbon atoms, or a case where $R^1$ and $R^2$ are linked to each other to form a ring is preferable, and a hydrogen atom is most preferable.

In Formula (B), * represents a bonding position.

The number of boronic acid groups represented by Formula (B) is not particularly limited, and may be one or a plurality (two or more).

One or more hydrocarbon groups included in these aliphatic hydrocarbon groups, aryl groups, and heterocyclic groups may be substituted with arbitrary substituents. Examples of the type of the substituent include substituents described in paragraph 0046 of JP2013-054201A.

The type of the polymerizable group is not particularly limited, and examples thereof include a radically polymerizable group and a cationically polymerizable group. Examples of the radically polymerizable group include a (meth)acryloyl group, an acrylamide group, a vinyl group, a styryl group, and an allyl group. Examples of the cationically polymerizable group include a vinyl ether group, an oxylanyl group, and an oxetanyl group. Among these, a (meth)acryloyl group, a styryl group, a vinyl group, an oxylanyl group, or an oxetanyl group is preferable, a (meth) acryloyl group or a styryl group is still more preferable, and a (meth)acryloyl group is particularly preferable.

The number of polymerizable groups is not particularly limited, and may be one or a plurality (two or more).

The molecular weight of the boronic acid monomer is not particularly limited, but from the viewpoint that compatibility with a poly functional monomer is excellent, is preferably 120 to 1200 and more preferably 180 to 800.

From the viewpoint that adhesiveness between the polarizer and a resin layer is more excellent, examples of a suitable aspect of the boronic acid monomer include a boronic acid monomer represented by Formula (B-1).

(B-1)

The definitions of $R^1$ and $R^2$ in Formula (B-1) are as described above.

Z represents a polymerizable group. The definition of the polymerizable group is as described above.

$X^1$ represents a single bond or a divalent linking group. Examples of the divalent linking group include —O—, —CO—, —NH—, —CO—NH—, —COO—, —O—COO—, an alkylene group, an arylene group, a heterocyclic group (heteroaryl group), and a divalent linking group selected from a combination of these groups.

Examples of the combination include an arylene group-COO-arylene group-O-alkylene group- and -arylene group-COO-alkylene group-.

Specific examples of the boronic acid monomer are described below, but the present invention is not limited thereto.

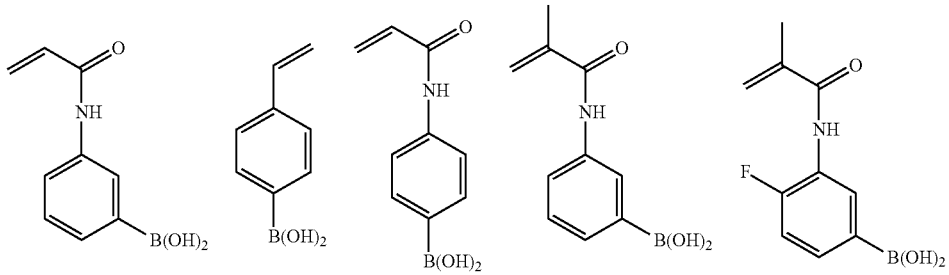

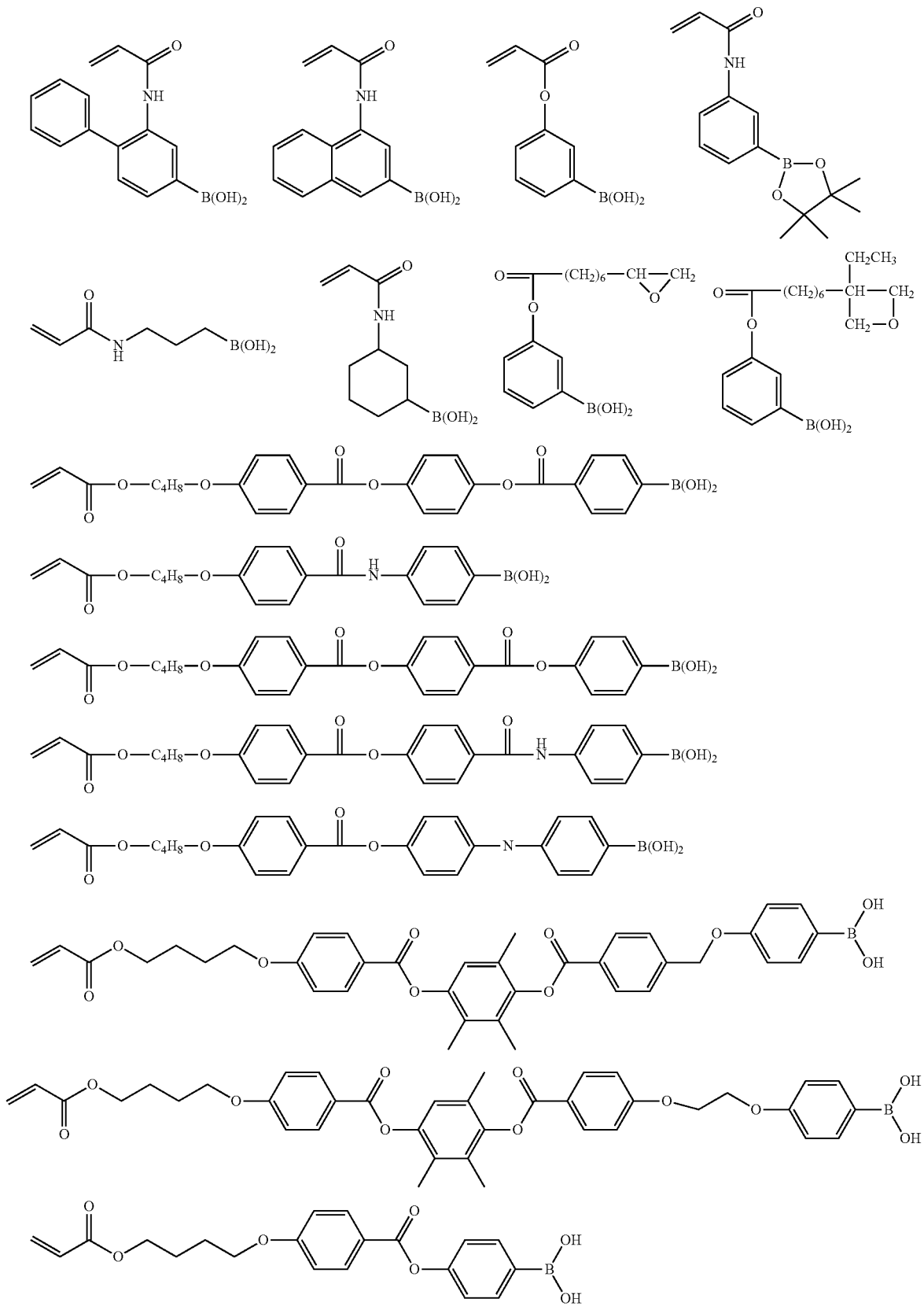

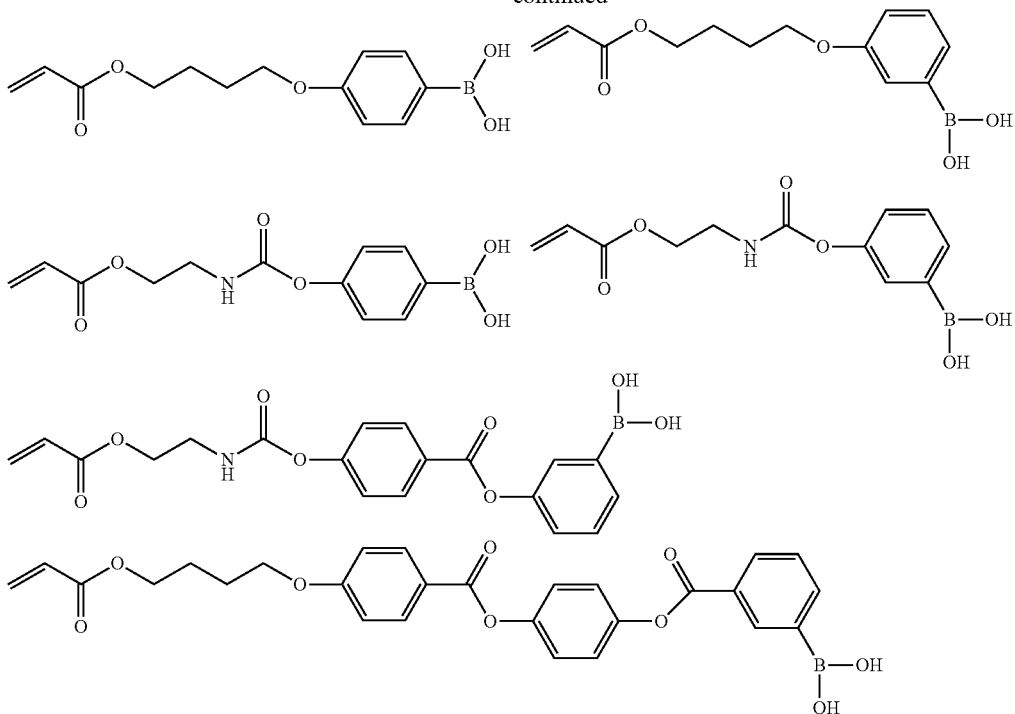

From the viewpoint that the effects of the present invention are more exhibited, the content of the boronic acid monomer is preferably 1% to 10% by mass, more preferably 1% to 9% by mass, and particularly preferably 2% to 8% by mass with respect to the total solid content of the liquid crystal composition.

(Solvent)

From the viewpoint of workability for forming a phase difference film, and the like, it is preferable that the liquid crystal composition of the present invention contains a solvent.

As the solvent, an organic solvent is preferable, and specific examples thereof include ketones (for example, acetone, 2-butanone, methyl ethyl ketone, methyl isobutyl ketone, cyclohexanone, cyclopentanone, and the like), ethers (for example, dioxane, tetrahydrofuran, and the like), aliphatic hydrocarbons (for example, hexane and the like), alicyclic hydrocarbons (for example, cyclohexane and the like), aromatic hydrocarbons (for example, toluene, xylene, trimethylbenzene, and the like), halogenated hydrocarbons (for example, dichloromethane, dichloroethane, dichlorobenzene, chlorotoluene, and the like), esters (for example, methyl acetate, ethyl acetate, butyl acetate, and the like), water, alcohols (for example, ethanol, isopropanol, butanol, cyclohexanol, and the like), cellosolves (for example, methyl cellosolve, ethyl cellosolve, propylene glycol monomethyl ether, and the like), cellosolve acetates (for example, propylene glycol monomethyl ether acetate, and the like), sulfoxides (for example, dimethyl sulfoxide, and the like), and amides (for example, dimethylformamide, dimethylacetamide, and the like). From the viewpoint that the effects of the present invention are more exhibited, it is preferable to use two or more suitable solvents from these in combination.

From the viewpoint that coatability of the liquid crystal composition is improved, the content of the solvent is preferably 55% to 85% by mass and more preferably 60% to 80% by mass with respect to the total mass of the liquid crystal composition.

In a case of containing two or more kinds of solvents, the total content thereof is preferably within the above-described range.

It is preferable that the liquid crystal composition contains a solvent A which does not dissolve the support and a solvent B which has a lower boiling point than the solvent A and dissolves the support.

Here, among solvents which do not dissolve the support, the solvent A means a solvent which does not dissolve the support and is contained in an amount of 10% by mass or more with respect to the total mass of the liquid crystal composition. In addition, among solvents which dissolve the support, the solvent B means a solvent which has a lower boiling point than the solvent A and is contained in an amount of 10% by mass or more.

In a case of containing such a solvent A and solvent B, since the solvent B which dissolves the support evaporates or volatilizes more rapidly than the solvent A in a case of applying the liquid crystal composition to the support, the damage of the support due to the solvent B can be reduced. As a result, the surface roughness of the support can be suppressed, so that a phase difference film having more excellent alignment can be obtained.

In the present specification, "solvent which does not dissolve the support" means a solvent that, in a case where a support having a size of 24×36 mm is immersed in a 30 ml-volume sample tube filled with the solvent for 5 hours, the support taken out from the sample tube is dried, and the mass thereof is measured, a dissolution proportion of the support [100×(mass of support before immersing−mass of support after immersing)/(mass of support before immersing)] can be 5% or less.

In addition, "solvent which dissolves the support" means a solvent that, in a case of obtaining a dissolution proportion of the support in the same manner as the method described in the definition of "solvent which does not dissolve the support", the dissolution proportion of the support can be more than 5%.

In the present specification, the boiling point of the solvent means a standard boiling point unless otherwise specified.

The difference (boiling point of solvent A−boiling point of solvent B) between the boiling points of the solvent A and the solvent B is preferably 20° C. to 120° C., more preferably 25° C. to 110° C., and still more preferably 50° C. to 95° C. In a case where the difference in boiling points is within the above-described range, the contrast of the phase difference film can be further increased.

From the viewpoint that the effects of the present invention are more exhibited, the boiling point of the solvent A is preferably 100° C. to 180° C., more preferably 105° C. to 170° C., particularly preferably 110° C. to 160° C., and most preferably 130° C. to 160° C.

From the viewpoint that the effects of the present invention are more exhibited, the boiling point of the solvent B is preferably 40° C. to 100° C., more preferably 45° C. to 95° C., and particularly preferably 50° C. to 90° C.

Specific examples of the solvent A include propylene glycol monomethyl ether acetate, butyl acetate, propylene glycol monomethyl ether, and methyl isobutyl ketone.

Specific examples of the solvent B include acetone, methyl ethyl ketone, ethyl acetate, and methyl acetate.

In a case where the liquid crystal composition contains the solvent A and the solvent B, both contents of the solvent A and the solvent B are 10% by mass or more with respect to the total mass of the liquid crystal composition.

From the viewpoint of maintaining solubility of the liquid crystalline compound, the content of the solvent A is preferably 90% by mass or less and more preferably 80% by mass or less, and from the viewpoint of improving coatability of the liquid crystal composition, the content of the solvent A is preferably 10% by mass or more and more preferably 20% by mass or more.

From the viewpoint of improving solubility of the liquid crystalline compound, the content of the solvent B is preferably 10% by mass or more and more preferably 20% by mass or more, and from the viewpoint that the surface roughness of the support can be further reduced, the content of the solvent B is preferably 90% by mass or less and more preferably 80% by mass or less.

(Other Components)

The liquid crystal composition may contain other components in addition to the above-described components, and examples of the other components include a liquid crystalline compound other than the above-described liquid crystalline compound, a leveling agent, a surfactant, a tilt angle control agent, an alignment aid, a plasticizer, and a cross-linking agent.

[Method for Manufacturing Phase Difference Film]

The phase difference film according to the embodiment of the present invention can be obtained by, for example, the following manufacturing method.

That is, an example of the method for manufacturing the phase difference film according to the embodiment of the present invention includes a step of applying a liquid crystal composition including a liquid crystalline compound and a solvent to a surface of a support to form a liquid crystal layer so as to be in contact with the support. In addition, the solvent contains the solvent A which does not dissolve the support and the solvent B which has a lower boiling point than the solvent A and dissolves the support. In addition, both contents of the solvent A and the solvent B are 10% by mass or more with respect to the total mass of the liquid crystal composition.

Since the support and liquid crystal composition used in the method for manufacturing the phase difference film according to the embodiment of the present invention are described in the section of the phase difference film according to the embodiment of the present invention, the descriptions thereof will be omitted.

As described above, by using the above-described support (support having a predetermined value or more values of the surface energy and the non-polar dispersion force component) and the liquid crystal composition containing the solvent A and the solvent B, the contrast of the phase difference film can be easily set to the above-described value and a phase difference film having excellent alignment can be obtained.

The liquid crystal composition can be applied by a known method (for example, a wire bar coating method, an extrusion coating method, a direct gravure coating method, a reverse gravure coating method, and a die-coating method).

In the method for manufacturing the phase difference film according to the embodiment of the present invention, it is preferable to perform an alignment treatment on the coating film obtained by applying the liquid crystal composition to the support.

The alignment treatment can be performed by drying or heating the coating film at room temperature (for example, 20° C. to 25° C.) or the like. In the case of a thermotropic liquid crystalline compound, generally, a liquid crystal phase formed by the alignment treatment can be transferred by changing temperature or pressure. In the case of a lyotropic liquid crystalline compound, the liquid crystal phase can also be transferred by a compositional ratio such as the amount of solvent.

For example, in a case where a rod-like liquid crystalline compound exhibits a smectic phase, generally, a temperature region in which a nematic phase is exhibited is higher than a temperature region in which the rod-like liquid crystalline compound exhibits the smectic phase. Therefore, in a case of including a rod-like liquid crystalline compound, by heating the liquid crystalline compound to a temperature region in which a nematic phase is exhibited, and then lowering the heating temperature to a temperature region in which the liquid crystalline compound exhibits a smectic phase, it is possible to transfer the liquid crystalline compound from the nematic phase to the smectic phase.

In a case where the liquid crystalline compound includes a rod-like liquid crystalline compound, in the temperature region in which the liquid crystalline compound exhibits the nematic phase, it is necessary to heat the liquid crystalline compound for a certain period of time until the liquid crystalline compound forms a monodomain. The heating time (heat aging time) is preferably 10 seconds to 5 minutes, more preferably 10 seconds to 3 minutes, and particularly preferably 10 seconds to 2 minutes.

In a case where the liquid crystalline compound includes a rod-like liquid crystalline compound, in the temperature region in which the liquid crystalline compound exhibits the smectic phase, it is necessary to heat the liquid crystalline compound for a certain period of time until the rod-like liquid crystalline compound exhibits the smectic phase. The heating time is preferably 10 seconds to 5 minutes, more preferably 10 seconds to 3 minutes, and most preferably 10 seconds to 2 minutes.

In the method for manufacturing the phase difference film according to the embodiment of the present invention, it is preferable to perform a curing treatment on the coating film obtained by applying the liquid crystal composition to the support. The curing treatment can also be said to be an immobilization treatment for immobilizing the alignment of the liquid crystalline compound.

Examples of the curing treatment include irradiation (light irradiation treatment) with active energy ray and/or heating treatment, and it is preferable that the curing treatment is performed by irradiation with active energy ray (preferably, ultraviolet rays). In a case where the liquid crystalline compound includes a polymerizable liquid crystal compound, the liquid crystals are immobilized by the polymerization of the polymerizable liquid crystal compound.

In a case where the alignment treatment of the coating film is performed together with the curing treatment of the coating film, it is preferable that the curing treatment is performed after the alignment treatment.

In the method for manufacturing the phase difference film according to the embodiment of the present invention, an alignment treatment to the support is not performed. This is because that, even in a case where the alignment treatment to the support is not performed, a phase difference film having excellent alignment is obtained by using the above-described support and liquid crystal composition.

According to this, since it is not necessary to manage the conditions required for the alignment treatment of the support, the manufacturing procedure of the phase difference film is simplified.

[Polarizing Plate]

A polarizing plate according to an embodiment of the present invention includes the above-described phase difference film and a polarizer. The description of the phase difference film is as described above and will be omitted.

[Polarizer]

It is sufficient that the polarizer (polarizing film) is a so-called linear polarizer having a function of converting light into specific linearly polarized light. The polarizer is not particularly limited, but an absorption polarizer can be used.

The type of the polarizer is not particularly limited, a commonly used polarizer can be used, and for example, any of an iodine-based polarizer, a dye-based polarizer using a dichroic dye, a polyene-based polarizer, and a polarizer using a wire grid can be used. The iodine-based polarizer and the dye-based polarizer are generally produced by adsorbing iodine or a dichroic dye onto polyvinyl alcohol and stretching the resultant.

In addition, as the polarizer, it is also preferable to use a coating type polarizer produced by coating or the like, using a thermotropic liquid crystalline dichroic coloring agent (for example, thermotropic liquid crystalline dichroic coloring agent used for a light-absorbing anisotropic film, which is described in JP2011-237513A). By using the coating type polarizer, it is possible to further reduce the thickness of a polarizer obtained by stretching polyvinyl alcohol. In addition, even in a case where an external force such as bending is applied, a polarizing plate with a small change in optical properties can be provided.

The thickness of the polarizer is not particularly limited, but is preferably 5 to 40 μm, more preferably 5 to 30 μm, and still more preferably 5 to 20 μm. With the above-described thickness, it is possible to reduce the thickness of a display device.

In the polarizing plate according to the embodiment of the present invention, it is preferable that the polarizer, the liquid crystal layer included in the phase difference film, and the support included in the phase difference film are arranged in this order.

[Optical Properties]

In the polarizing plate according to the embodiment of the present invention, it is preferable that the support and the polarizer are arranged such that a slow axis of the support is parallel to an absorption axis of the polarizer.

It is preferable that the support has 100 to 180 nm of Re1 and 50 to 90 nm of Rth1. In addition, it is preferable that the liquid crystal layer has −10 to 10 nm of Re2 and −150 to −80 nm of Rth2.

In a case of using a combination of the support in which Re1 and Rth1 are within the above-described ranges and the liquid crystal layer in which Re2 and Rth2 are within the above-described ranges, light leak and change in tint in a case of being viewed from an oblique direction can be further reduced in a case of being applied to a liquid crystal display device having a transverse electric field type liquid crystal cell.

From the viewpoint that the above-described effects are more exhibited, Re1 is more preferably 110 to 170 nm and particularly preferably 120 to 160 nm. From the viewpoint that the above-described effects are more exhibited, Rth1 is more preferably 55 to 85 nm and particularly preferably 60 to 80 nm.

From the viewpoint that the above-described effects are more exhibited, Re2 is more preferably −5 to 5 nm and particularly preferably −2 to 2 nm. From the viewpoint that the above-described effects are more exhibited, Rth2 is more preferably −140 to −85 nm and particularly preferably −130 to −90 nm.

Here, Re1 means an in-plane retardation (nm) of the support at a wavelength of 550 nm, Rth1 means a thickness-direction retardation (nm) of the support at a wavelength of 550 nm, Re2 means an in-plane retardation (nm) of the liquid crystal layer at a wavelength of 550 nm, and Rth2 means a thickness-direction retardation (nm) of the liquid crystal layer at a wavelength of 550 nm.

From the viewpoint that the light leak and change in tint in a case of being viewed from an oblique direction are further reduced, it is preferable that both the support and the liquid crystal layer have reciprocal wavelength dispersibility. The definition of the reciprocal wavelength dispersibility is as described above.

[Polarizer Protective Film]

A polarizer protective film may be arranged on a surface of the polarizer. The polarizer protective film may be arranged only on one surface of the polarizer (on the surface opposite to the phase difference film side) or may be arranged on both surfaces of the polarizer.

The configuration of the polarizer protective film is not particularly limited, and may be, for example, a transparent support or a hard coat layer, or a laminate of the transparent support and the hard coat layer.

As the hard coat layer, a known layer can be used, and for example, a layer obtained by polymerizing and curing polyfunctional monomers may be used.

In addition, a known transparent support can be used as the transparent support, and for example, as a material forming the transparent support, a cellulose-based polymer (hereinafter, referred to as cellulose acylate) typified by triacetyl cellulose, a thermoplastic norbornene-based resin (ZEONEX or ZEONOR manufactured by Nippon Zeon Co., Ltd., ARTON manufactured by JSR Corporation, and the like), an acrylic resin, or a polyester-based resin can be used.

The thickness of the polarizer protective film is not particularly limited, but from the reason that the thickness of the polarizing plate can be reduced, is preferably 50 μm or less.

A pressure-sensitive adhesive layer or an adhesive layer may be arranged between the respective layers to ensure adhesiveness between the respective layers. Furthermore, a transparent support may be provided between the respective layers.

[Liquid Crystal Display Device]

A liquid crystal display device according to an embodiment of the present invention is a liquid crystal display device including the above-described polarizing plate and a transverse electric field type liquid crystal cell, in which, from a viewing side, the polarizer included in the polarizing plate, the liquid crystal layer included in the polarizing plate, the support included in the polarizing plate, and the liquid crystal cell are arranged in this order.

The phase difference film according to the embodiment of the present invention, which includes the polarizing plate and the liquid crystal layer, can be suitably used as an optical compensation film.

Hereinafter, the liquid crystal cell constituting the liquid crystal display device will be described in detail.

[Liquid Crystal Cell]

The liquid crystal cell used in the liquid crystal display device according to the embodiment of the present invention is a transverse electric field type (IPS: In-Plane-Switching).

In the transverse electric field type liquid crystal cell, rod-like liquid crystal molecules are aligned substantially parallel to a substrate, and application of an electric field parallel to the substrate surface causes the liquid crystal molecules to respond planarly. The transverse electric field type displays black in a state where no electric field is applied and a pair of upper and lower polarizing plates have absorption axes which are orthogonal to each other. A method of improving the viewing angle by reducing light leakage during black display in an oblique direction using an optical compensation film is disclosed in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

EXAMPLES

Hereinafter, the present invention will be described in more detail based on examples. The materials, the amount of the materials used, the ratio between the materials, the content and the procedures of treatment, and the like shown in the following examples can be appropriately modified as long as the modification does not depart from the gist of the present invention. Accordingly, the scope of the present invention is not limited to the following examples.

Example 1

<Production of Phase Difference Film>

As a support of the phase difference film, a polycarbonate film (manufactured by TEIJIN LIMITED., trade name: PURE-ACE; Re1(550)=154 nm, Rth1(550)=77 nm, film thickness: 76 μm) was prepared.

In a state where an alignment treatment was not performed to this support, a liquid crystal composition 1 prepared with the following composition was applied to one surface of the support with a #3.6 wire bar. Next, in order to dry the solvent of the liquid crystal composition 1 and align and mature a liquid crystalline compound, the film was heated for 60 seconds with warm air at 45° C. Irradiation (300 mJ/cm$^2$) with ultraviolet rays was performed at 25° C. and an oxygen concentration of 100 ppm under a nitrogen purge to immobilize the alignment of the liquid crystalline compound, thereby producing a phase difference film of Example 1. Optical properties (Re2 and Rth2) of a liquid crystal layer are shown in Table 3.

| Liquid crystal composition 1 | |
|---|---|
| Liquid crystalline compound R1 | 28.0 parts by mass |
| Liquid crystalline compound R2 | 10.0 parts by mass |
| (liquid crystalline compound having reciprocal wavelength dispersibility) | |
| Liquid crystalline compound R3 | 54.0 parts by mass |
| (liquid crystalline compound having reciprocal wavelength dispersibility) | |
| Liquid crystalline compound R4 | 8.0 parts by mass |
| Boronic acid monomer B1 | 4.5 parts by mass |
| Monomer K1 | 8.0 parts by mass |
| Polymerization initiator P1 | 5.0 parts by mass |
| Polymerization initiator P2 | 2.0 parts by mass |
| Surfactant S1 | 0.4 parts by mass |
| Surfactant S2 | 0.5 parts by mass |
| Propylene glycol monomethyl ether acetate (solvent A) | 56.2 parts by mass |
| Acetone (solvent B) | 216.3 parts by mass |
| Methanol | 8.4 parts by mass |

Liquid Crystalline Compound R1

Liquid crystalline compound R1 is a mixture of the following liquid crystalline compounds (RA), (RB), and (RC) in 83:15:2 (mass ratio).

(RA)

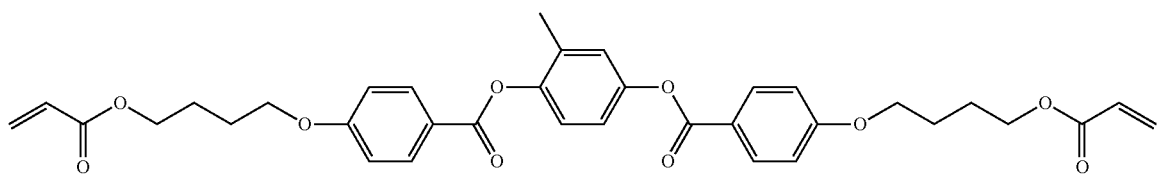

-continued
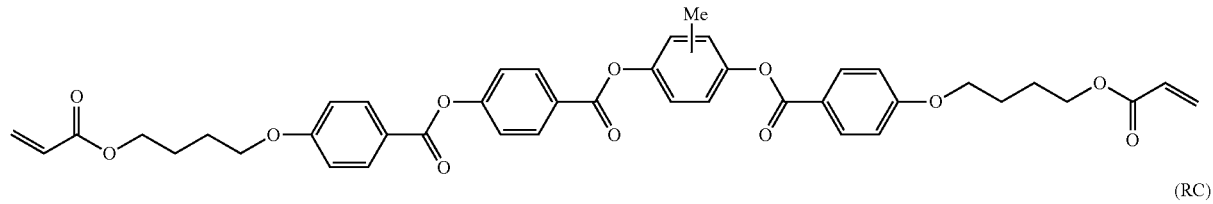
(RB)
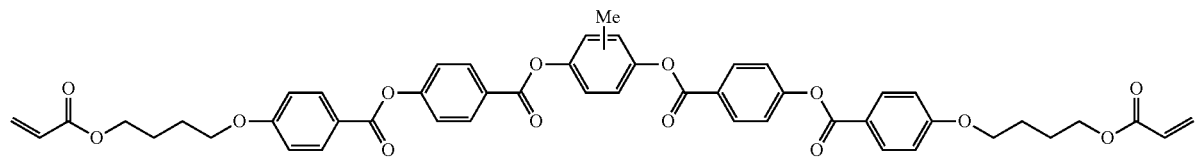
(RC)
Liquid Crystalline Compound R2
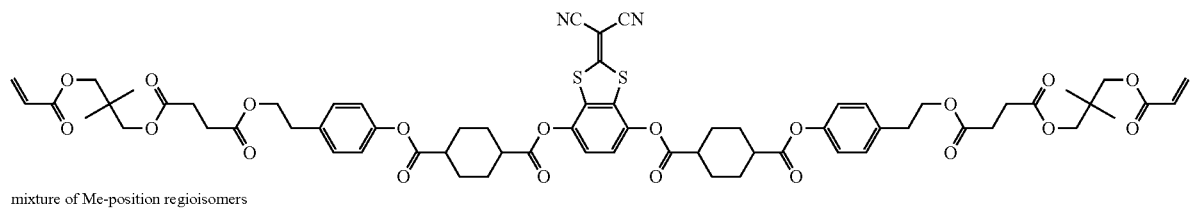
mixture of Me-position regioisomers
Liquid Crystalline Compound R3
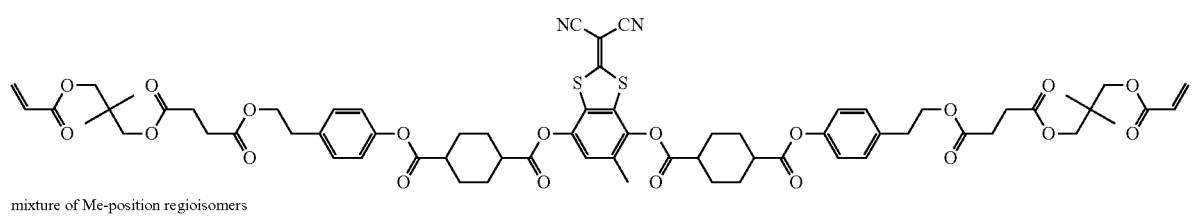
mixture of Me-position regioisomers
Liquid Crystalline Compound R4
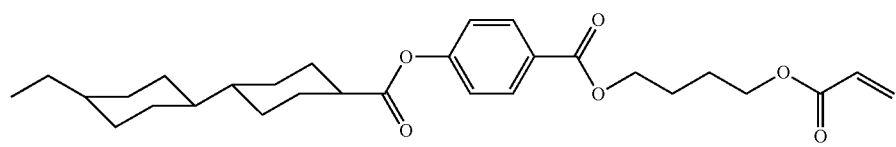 [SMILES: C=CC(=O)OCCCCOC(=O)c1ccc(OC(=O)C2CCC(C3CCC(CC)CC3)CC2)cc1]
Boronic Acid Monomer B1
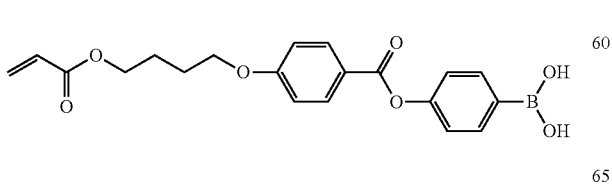
Monomer K1: A-600 (manufactured by Shin-Nakamura Chemical Co., Ltd.)
Polymerization Initiator P1
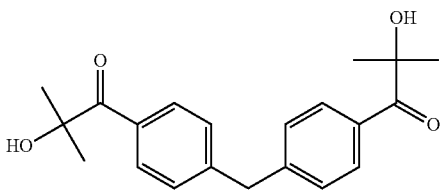 [SMILES: CC(C)(O)C(=O)c1ccc(Cc2ccc(C(=O)C(C)(C)O)cc2)cc1]

Polymerization Initiator P2

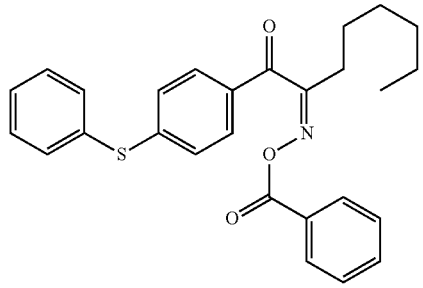 [SMILES: CCCCCC/C(=N/OC(=O)c1ccccc1)C(=O)c1ccc(Sc2ccccc2)cc1]

Surfactant S1 (Weight-Average Molecular Weight: 15,000)

In the following formula, the numerical value in parentheses of the repeating unit means % by mass.

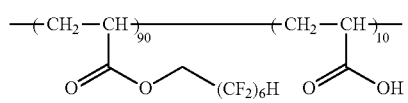

Surfactant S2 (Weight-Average Molecular Weight: 11,200)

In the following formula, the numerical value in parentheses of the repeating unit means % by mass.

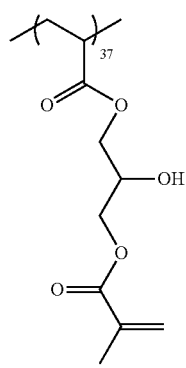

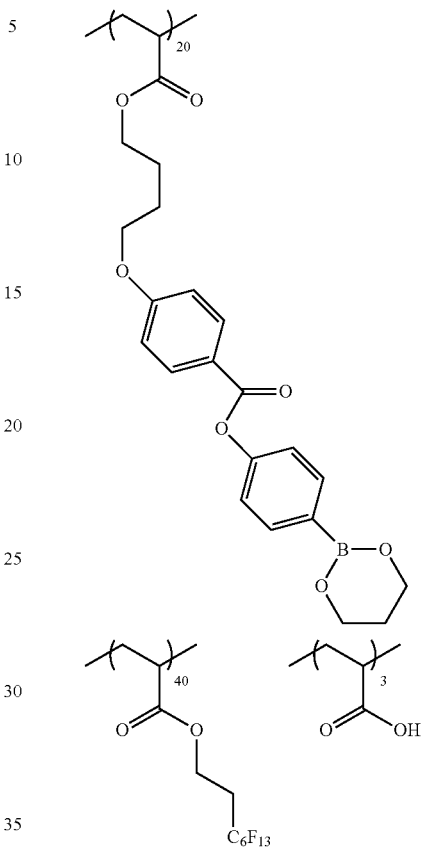

<Production of Protective Film>

The following composition was put into a mixing tank, and stirred while heating to dissolve each component, thereby preparing a cellulose acetate solution.

| Cellulose acetate solution | |
|---|---|
| Cellulose acetate having an acetylation degree of 60.7% to 61.1% | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

16 parts by mass of the following retardation enhancer (A), 92 parts by mass of methylene chloride, and 8 parts by mass of methanol were put into another mixing tank, and stirred while heating to prepare a retardation enhancer solution. 25 parts by mass of the retardation enhancer solution was mixed with 474 parts by mass of the cellulose acetate solution, and sufficiently stirred to prepare a dope. The amount of the retardation enhancer added was 6.0 parts by mass with respect to 100 parts by mass of cellulose acetate.

Retardation enhancer (A)

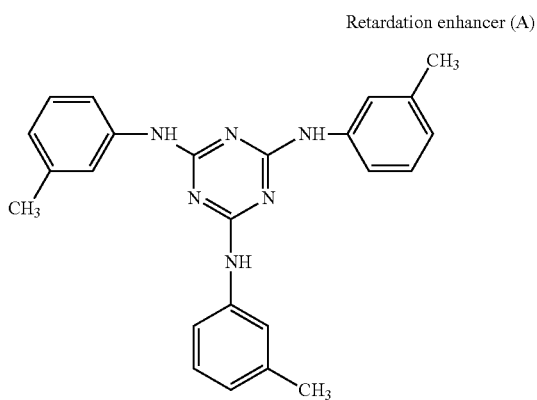 [SMILES: Cc1cccc(Nc2nc(Nc3cccc(C)c3)nc(Nc3cccc(C)c3)n2)c1]

The obtained dope was cast using a band stretching machine. After the film surface temperature on the band reaches 40° C., the film was dried for 1 minute with warm air at 70° C., and dried from the band for 10 minutes with a drying air at 140° C. to produce a triacetyl cellulose film having a residual solvent amount of 0.3% by mass. The film thickness was 41 μm. This film was used as a protective film.

As a result of measuring a phase difference of the protective film, Re=1 nm and Rth=40 nm.

<Saponification Treatment of Protective Film>

The produced protective film was immersed in 2.3 mol/L of sodium hydroxide aqueous solution at 55° C. for 3 minutes. Thereafter, the film was washed in a washing bath at room temperature, and neutralized with 0.05 mol/L of sulfuric acid at 30° C. The neutralized film was washed again in a washing bath at room temperature, and further dried with warm air at 100° C., thereby performing a saponification treatment on the surface of the protective film.

<Production of Polarizing Plate>

The saponified protective film produced as described above, a polyvinyl alcohol-based polarizer, and the phase difference film were laminated together using an adhesive such that the absorption axis of the polarizer was parallel to the slow axis of the phase difference film and the liquid crystal layer side of the phase difference film was the polarizer side, thereby producing a first polarizing plate of Example 1. As the adhesive, a 3% aqueous solution of PVA (manufactured by Kuraray Co., Ltd., PVA-117H) was used. In this case, adhesiveness between the polarizer and the phase difference film in the first polarizing plate was practically sufficient.

In addition, a second polarizing plate was produced by laminating the saponified protective film, the polyvinyl alcohol-based polarizer, and the saponified protective film in the same manner as described above.

In addition, as a polarizing plate for evaluating alignment, a third polarizing plate and a fourth polarizing plate were produced by attaching the saponified protective film to only one side of the polyvinyl alcohol-based polarizer in the same manner as described above.

<Production of Liquid Crystal Display Device>

A commercially available liquid crystal display device (iPad (registered trademark), manufactured by Apple Inc.) was disassembled, polarizing plates attached on both surfaces were peeled off, and the first polarizing plate was arranged on the viewing side and the second polarizing plate was arranged on the backlight side. In this case, the first polarizing plate was attached using a pressure sensitive adhesive (SK2057 manufactured by Soken Chemical Co., Ltd.) such that the support in the phase difference film of the first polarizing plate was on the liquid crystal cell side, thereby producing a liquid crystal display device of Example 1. In addition, in this case, the first polarizing plate and the second polarizing plate were attached such that the slow axis of the liquid crystal in the cell was orthogonal to the absorption axis of the first polarizing plate, and such that the slow axis of the liquid crystal in the cell is parallel to the absorption axis of the second polarizing plate.

Examples 2 to 4 and Comparative Examples 1 to 4

Each phase difference film of Examples 2 to 4 and Comparative Examples 1 to 4 was produced in the same manner as in Example 1, except that, in the production of the phase difference film, at least one of the type of the support, the type of the solvent A included in the liquid crystal composition, the type of the solvent B included in the liquid crystal composition, or the presence or absence of the boronic acid monomer was changed as shown in Table 3. Optical properties of each support and optical properties of each phase difference film are shown in Table 3.

In addition, each polarizing plate and each liquid crystal display device of Examples 2 to 4 and Comparative Examples 1 to 4 were produced in the same manner as in Example 1, except that the phase difference film obtained as described above was used.

The outline of the support and the solvent shown by abbreviation in Table 3 is shown below.

PC: polycarbonate film (manufactured by TEIJIN LIMITED., trade name: PURE-ACE; Re1(550)=154 nm, Rth1(550)=77 nm, film thickness: 76 μm)

ARTON: polycycloolefin film (manufactured by JSR Corporation, trade name: ARTON; Re1(550)=124 nm, Rth1(550)=62 nm, film thickness: 40 μm)

TAC: triacetyl cellulose film (manufactured by FUJIFILM Corporation, trade name: ZRD40; Re1(550)=0 nm, Rth1(550)=−1 nm, film thickness: 40 μm)

PGMEA: propylene glycol monomethyl ether acetate

MEK: methyl ethyl ketone

<Surface Energy>

Regarding the supports used in the production of the phase difference films of Examples and Comparative Examples, the surface energy of the surface on which the liquid crystal layer is formed and the non-polar dispersion force component included in the surface energy were measured by the above-described method.

<Alignment>

According to the following standard, the alignment was evaluated by arranging the third polarizing plate and the fourth polarizing plate in this order in a state of crossed nicol on Shakasten (LED Viewer Pro HR-2 manufactured by FUJICOLOR Corporation), arranging the phase difference film between the polarizing plates so as to be parallel to the absorption axis of the third polarizing plate or the fourth polarizing plate, and viewing the film from the front (normal direction of the film).

OK: no light leak was observed before and after the phase difference film.

NG: light leak was observed before and after the phase difference film.

<Adhesiveness>

Regarding the adhesiveness between the liquid crystal layer and the support in the phase difference film, a cross cut test specified in JIS K5600-5-6 was performed, and peelability from the support in this case was evaluated according to the following standard.

A: area where the liquid crystal layer was peeled off was less than 1%.

B: area where the liquid crystal layer was peeled off was 1% or more and less than 50%.

C: area where the liquid crystal layer was peeled off was 50% or more.

<Contrast>

The contrast of the phase difference film was obtained as follows. Here, a luminance colorimeter (BM5 manufactured by TOPCON TECHNOHOUSE CORPORATION) was used for the luminance measurement.

First, the third polarizing plate and the fourth polarizing plate were arranged on the Shakasten in this order, the fourth polarizing plate was rotated to search for the darkest arrangement (crossed nicol arrangement), and the luminance (Ynb) was measured. Thereafter, the fourth polarizing plate was rotated by 90° to be a paranicol arrangement, and the luminance (Ynw) was measured to calculate a contrast ratio CRn=Ynw/Ynb.

Next, the phase difference film was arranged between the third polarizing plate and the fourth polarizing plate in the crossed nicol arrangement, and the luminance (Ytb) was measured in a state where the phase difference film was rotated to be the darkest arrangement. Thereafter, the fourth polarizing plate was rotated by 90°, and the luminance (Ytw) was measured to calculate a contrast ratio CRt=Ytw/Ytb.

Using CRn and CRt described above, the contrast CRf of the phase difference film was calculated from Expression C.

$$1/CRf = 1/CRt - 1/CRn \quad \text{(Expression C)}$$

<Light Leak in Black Display and Tint>

The produced liquid crystal display device was arranged on a diffused light source, and using a measuring device "EZ-Contrast XL88" (manufactured by ELDIM), the luminance in black display and the tint were measured from an azimuthal angle 0° (horizontal direction) to 359° counterclockwise in 1° increments, and from a polar angle 0° (front direction) to 88° in 1° increments. Light leak at a polar angle of 60° was evaluated according to the following evaluation standard.

A: very little light leak was observed, which is particularly excellent.

B: little light leak was observed, which is excellent.

C: some light leak was observed, which is not a problem in practical use.

D: much light leak was observed, which is unacceptable.

Black tint at a polar angle of 60° was evaluated according to the following evaluation standard.

A: very little change in tint was observed, which is particularly excellent.

B: little change in tint was observed, which is excellent.

C: some change in tint was observed, which is not a problem in practical use.

D: much change in tint was observed, which is unacceptable.

The results of the above-described evaluation tests are shown in Table 3.

In Table 3, Re1(450), Re1(550), and Re1(650) respectively represent an in-plane retardation of the support at a wavelength of 450 nm, an in-plane retardation of the support at a wavelength of 550 nm, and an in-plane retardation of the support at a wavelength of 650 nm. In addition, Rth1(550) represents a thickness-direction retardation of the support at a wavelength of 550 nm.

In addition, in Table 3, Re2(550) represents an in-plane retardation of the liquid crystal layer at a wavelength of 550 nm. In addition, Rth2(450), Rth2(550), and Rth2(650) respectively represent a thickness-direction retardation of the liquid crystal layer at a wavelength of 450 nm, a thickness-direction retardation of the liquid crystal layer at a wavelength of 550 nm, and a thickness-direction retardation of the liquid crystal layer at a wavelength of 650 nm.

TABLE 3

| | Support | | Liquid crystal compound | | | | | Evaluation result | |
|---|---|---|---|---|---|---|---|---|---|
| | | Dispersion | Solvent A | | Solvent B | | | | |
| | Surface | force | | Boiling | | Boiling | Boronic | | |
| | Type of | energy | component | Type of | point | Type of | point | acid | | Adhesive- |
| | support | [mN/m] | [mN/m] | solvent | [° C.] | solvent | [° C.] | monomer | Alignment | ness |
| Example 1 | PC | 49.5 | 49.5 | PGMEA | 146 | Acetone | 56 | Presence | OK | A |
| Example 2 | PC | 49.5 | 49.5 | PGMEA | 146 | MEK | 80 | Presence | OK | A |
| Example 3 | PC | 49.5 | 49.5 | Butyl acetate | 126 | Acetone | 56 | Presence | OK | A |
| Example 4 | PC | 49.5 | 49.5 | PGMEA | 146 | Acetone | 56 | Absence | OK | B |
| Comparative Example 1 | ARTON | 43.9 | 43.1 | PGMEA | 146 | Acetone | 56 | Presence | NG | C |
| Comparative Example 2 | TAC | 46.6 | 36.5 | PGMEA | 146 | Acetone | 56 | Presence | NG | C |
| Comparative Example 3 | PC | 49.5 | 49.5 | Butyl acetate | 126 | Cyclohexanone | 131 | Presence | NG | A |
| Comparative Example 4 | PC | 49.5 | 49.5 | Cyclohexanone | 156 | MEK | 80 | Presence | NG | A |

| | Evaluation result | | | | | | | | |
|---|---|---|---|---|---|---|---|---|---|
| | | | Support | | | | Liquid crystal layer | | |
| | | Light | Re1 | Re1 | Re1 | Rth1 | Re2 | Rth2 | Rth2 | Rth2 |
| | Contrast | leak/tint | (450) | (550) | (650) | (550) | (550) | (450) | (550) | (650) |
| Example 1 | 56000 | A/A | 128 | 154 | 163 | 77 | −1 | −96 | −101 | −102 |
| Example 2 | 64000 | A/A | 128 | 154 | 163 | 77 | −1 | −96 | −101 | −102 |

TABLE 3-continued

| | | | | | | | | | |
|---|---|---|---|---|---|---|---|---|---|
| Example 3 | 52000 | A/A | 128 | 154 | 163 | 77 | −1 | −95 | −100 | −101 |
| Example 4 | 20000 | B/A | 128 | 154 | 163 | 77 | −1 | −95 | −100 | −101 |
| Comparative Example 1 | 7000 | C/A | 125 | 124 | 124 | 62 | −1 | −90 | −95 | −96 |
| Comparative Example 2 | 1000 | D/A | 0 | 0 | 0 | −1 | 0 | 0 | 0 | 0 |
| Comparative Example 3 | 10000 | B/A | 128 | 154 | 163 | 77 | −1 | −94 | −99 | −100 |
| Comparative Example 4 | 9000 | C/A | 128 | 154 | 163 | 77 | −1 | −93 | −98 | −99 |

As shown in Table 3, in a case where a support having a surface energy and a non-polar dispersion force component of 45 mN/m or more was used, and the contrast of the phase difference film was more than 10000, it was found that alignment of the phase difference film was excellent (Examples).

In addition, from the comparison of Examples 1 to 4, in a case where a liquid crystal composition containing a boronic acid monomer was used (Examples 1 to 3), it has been shown that a phase difference film having higher contrast, less light leak, and more excellent adhesiveness between the support and the liquid crystal layer was obtained.

On the other hand, in a case where a phase difference film which did not satisfy at least one of the value of the surface energy of the support, the value of the non-polar dispersion force component of the surface energy of the support, or the value of the contrast of the phase difference film was used, it was found that alignment of the phase difference film was inferior (Comparative Examples).

What is claimed is:

1. A polarizing plate comprising:
a phase difference film; and
a polarizer,
wherein the phase difference film comprises:
a support; and
a liquid crystal layer formed of a liquid crystal composition containing a liquid crystalline compound so as to be in contact with the support,
a surface energy of a surface of the support on which the liquid crystal layer is formed is 45 mN/m or more and a non-polar dispersion force component included in the surface energy is 45 mN/m or more,
the liquid crystalline compound is immobilized in an aligned state,
a contrast of the phase difference film is more than 10000,
a slow axis of the support is parallel to an absorption axis of the polarizer,
the support has 100 to 180 nm of Re1 and 50 to 90 nm of Rth1,
the liquid crystal layer has −10 to 10 nm of Re2 and −150 to −80 nm of Rth2, and
the support and the liquid crystal layer have a reciprocal wavelength dispersibility,
where, Re1 means an in-plane retardation (nm) of the support at a wavelength of 550 nm, Rth1 means a thickness-direction retardation (nm) of the support at a wavelength of 550 nm, Re2 means an in-plane retardation (nm) of the liquid crystal layer at a wavelength of 550 nm, and Rth2 means a thickness-direction retardation (nm) of the liquid crystal layer at a wavelength of 550 nm.

2. The polarizing plate according to claim 1,
wherein a material constituting the support is polycarbonate.

3. The polarizing plate according to claim 1,
wherein the liquid crystal layer exhibits smectic properties.

4. The polarizing plate according to claim 1,
wherein the liquid crystal composition further contains a boronic acid monomer having a polymerizable group and a boronic acid group represented by Formula (B),

(B)

in Formula (B), $R^1$ and $R^2$ each independently represent a hydrogen atom, a substituted or unsubstituted aliphatic hydrocarbon group, an aryl group, or a heterocyclic group, $R^1$ and $R^2$ may be linked to each other to form a ring, and * represents a bonding position.

5. The polarizing plate according to claim 1,
wherein the polarizer, the liquid crystal layer included in the phase difference film, and the support included in the phase difference film are arranged in this order.

6. A liquid crystal display device comprising:
the polarizing plate according to claim 1; and
a transverse electric field type liquid crystal cell,
wherein, from a viewing side, the polarizer included in the polarizing plate, the liquid crystal layer included in the polarizing plate, the support included in the polarizing plate, and the liquid crystal cell are arranged in this order.

7. The polarizing plate according to claim 2,
wherein the liquid crystal layer exhibits smectic properties.

8. The polarizing plate according to claim 2,
wherein the liquid crystal composition further contains a boronic acid monomer having a polymerizable group and a boronic acid group represented by Formula (B),

(B)

in Formula (B), $R^1$ and $R^2$ each independently represent a hydrogen atom, a substituted or unsubstituted aliphatic hydrocarbon group, an aryl group, or a heterocyclic group, $R^1$ and $R^2$ may be linked to each other to form a ring, and * represents a bonding position.

9. The polarizing plate according to claim 3, wherein the liquid crystal composition further contains a boronic acid monomer having a polymerizable group and a boronic acid group represented by Formula (B),

(B)

in Formula (B), $R^1$ and $R^2$ each independently represent a hydrogen atom, a substituted or unsubstituted aliphatic hydrocarbon group, an aryl group, or a heterocyclic group, $R^1$ and $R^2$ may be linked to each other to form a ring, and * represents a bonding position.

* * * * *